(12) United States Patent
Ito et al.

(10) Patent No.: US 9,088,730 B2
(45) Date of Patent: Jul. 21, 2015

(54) SHOOTING DEVICE, IMAGE PROCESSING METHOD, AND RECORDING MEDIUM

(71) Applicant: OLYMPUS IMAGING CORP., Shibuya-ku, Tokyo (JP)

(72) Inventors: Kensei Ito, Tokyo (JP); Maki Toida, Tokyo (JP); Shogo Shimamura, Tokyo (JP); Akira Tani, Sagamihara (JP); Manabu Ichikawa, Tokyo (JP)

(73) Assignee: OLYMPUS IMAGING CORP. (JP)

( * ) Notice: Subject to any disclaimer, the term of this patent is extended or adjusted under 35 U.S.C. 154(b) by 23 days.

(21) Appl. No.: 13/932,601

(22) Filed: Jul. 1, 2013

(65) Prior Publication Data
US 2014/0009643 A1    Jan. 9, 2014

(30) Foreign Application Priority Data

Jul. 6, 2012 (JP) .................................. 2012-152276

(51) Int. Cl.
| | |
|---|---|
| *H04N 5/265* | (2006.01) |
| *H04N 5/232* | (2006.01) |
| *H04N 5/262* | (2006.01) |
| *H04N 5/77* | (2006.01) |
| *H04N 9/79* | (2006.01) |
| *H04N 1/00* | (2006.01) |
| *G11B 27/034* | (2006.01) |
| *G11B 27/30* | (2006.01) |
| *G06T 11/60* | (2006.01) |
| *H04N 101/00* | (2006.01) |

(52) U.S. Cl.
CPC ............... *H04N 5/265* (2013.01); *G06T 11/60* (2013.01); *G11B 27/3027* (2013.01); *H04N 1/00453* (2013.01); *H04N 5/23216* (2013.01); *H04N 5/23245* (2013.01); *H04N 5/23293* (2013.01); *H04N 5/2621* (2013.01); *H04N 5/772* (2013.01); *H04N 9/7921* (2013.01); *G11B 27/034* (2013.01); *G11B 27/309* (2013.01); *H04N 2101/00* (2013.01)

(58) Field of Classification Search
USPC ...................................................... 348/333.05
See application file for complete search history.

(56) References Cited

U.S. PATENT DOCUMENTS

| | | | |
|---|---|---|---|
| 6,510,283 B1 * | 1/2003 | Yamagishi ................ | 348/208.99 |
| 8,310,582 B2 * | 11/2012 | Yoon ......................... | 348/333.05 |
| 2002/0024608 A1 * | 2/2002 | Ejima et al. .............. | 348/333.05 |
| 2007/0263071 A1 * | 11/2007 | Lee et al. ................... | 348/14.02 |
| 2008/0313568 A1 * | 12/2008 | Park et al. ...................... | 715/835 |
| 2010/0073544 A1 * | 3/2010 | Naruto et al. ............. | 348/333.02 |
| 2011/0043651 A1 * | 2/2011 | Nonaka et al. ............. | 348/220.1 |

* cited by examiner

FOREIGN PATENT DOCUMENTS

| | | |
|---|---|---|
| JP | 2007053616 A | 3/2007 |
| JP | 4529561 B2 | 8/2010 |

*Primary Examiner* — Jason Flohre
(74) *Attorney, Agent, or Firm* — Volpe and Koenig, P.C.

(57) ABSTRACT

A shooting device includes: a display unit which is provided with a plurality of display areas; an image pickup unit which acquires an image by capturing a subject; a display control unit which controls the display unit so that an image displayed in a display area in a plurality of display areas is changed from a live view image to an image acquired by the image pickup unit at the shoot instruction when a shoot instruction is received, and an image displayed on the display area specified by the cancel instruction is changed to a specified image when the cancel instruction that specifies the display area is received; and a combined image processing unit which combines image data of the plurality of images displayed on the plurality of display areas, and generates image data of a combined image which is laid out as being displayed on the display unit.

9 Claims, 37 Drawing Sheets

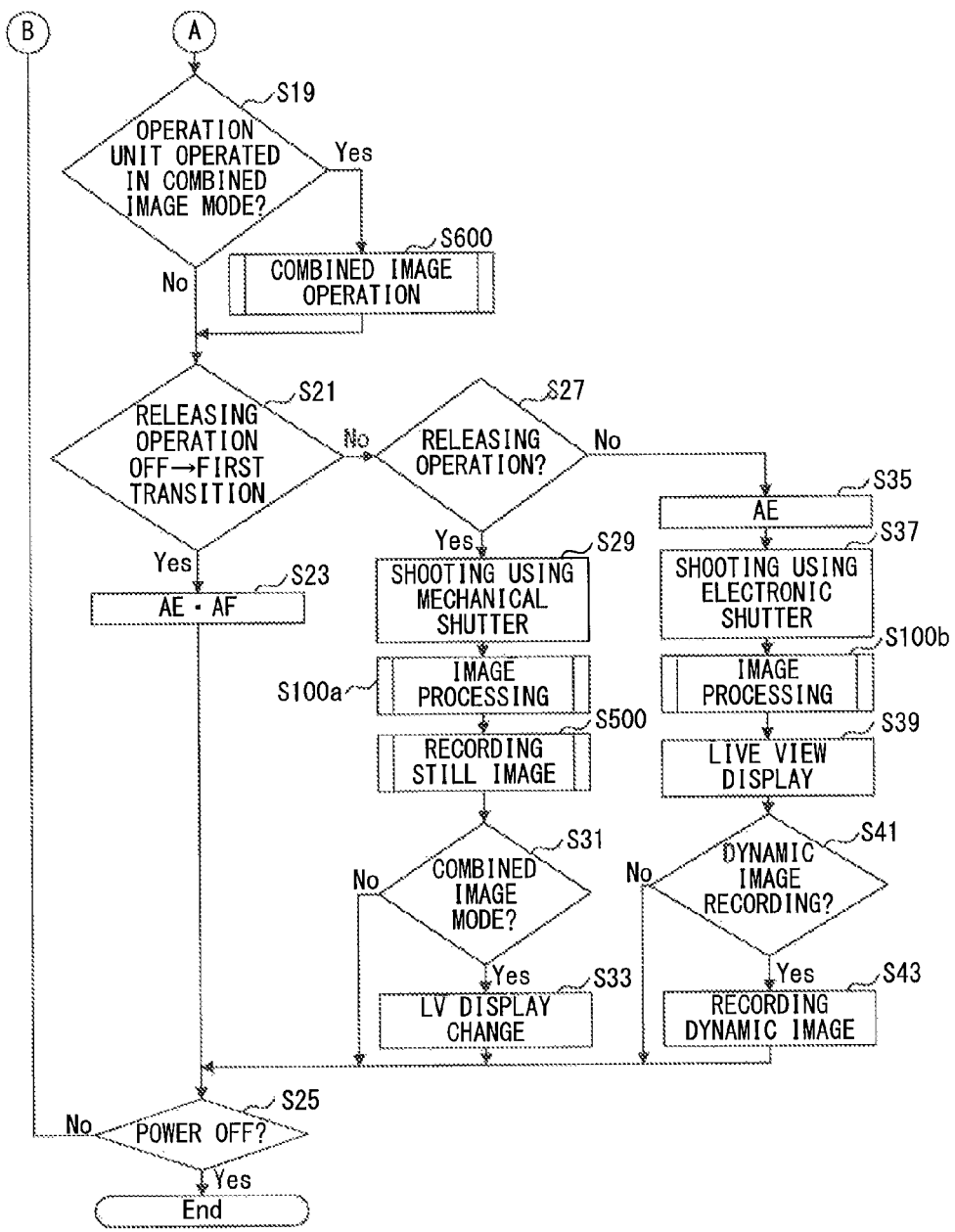
F I G. 2 B

F I G. 1 0 A 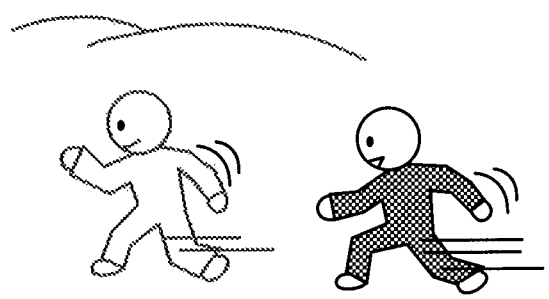
F I G. 1 0 B 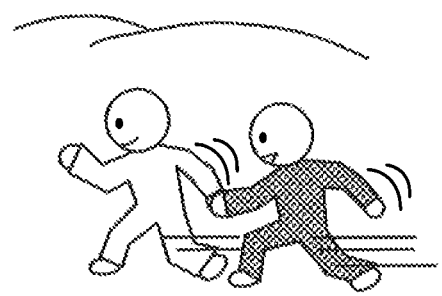
F I G. 1 0 C 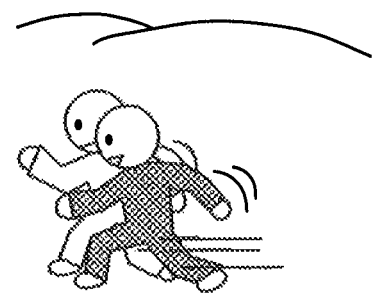
F I G. 1 0 D 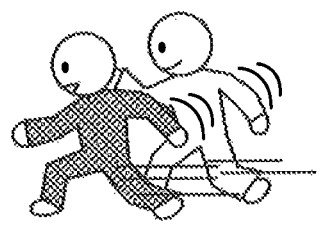

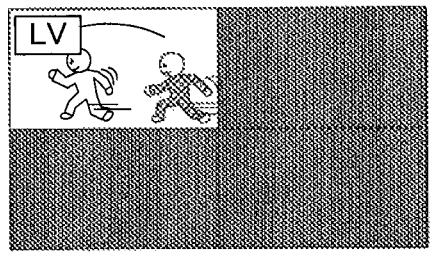
FIG. 12A
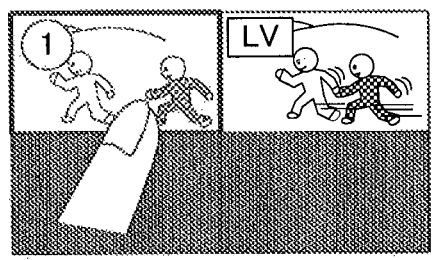
FIG. 12B
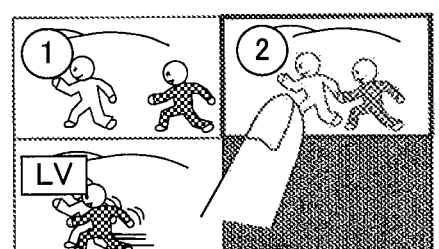
FIG. 12C
FIG. 12D
FIG. 12E
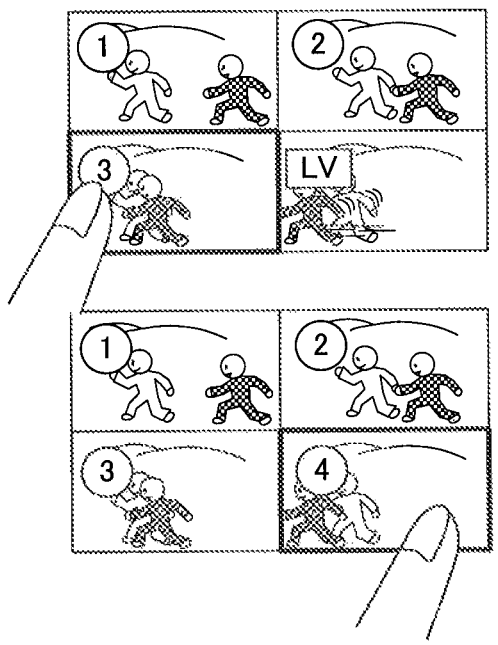

F I G. 1 5 A 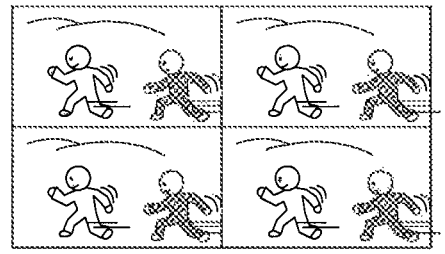
F I G. 1 5 B 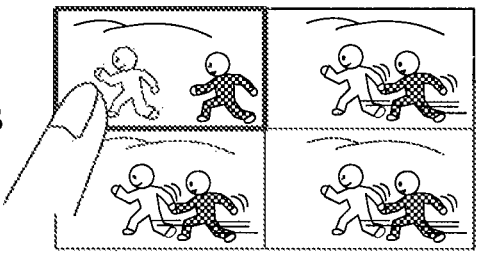
F I G. 1 5 C 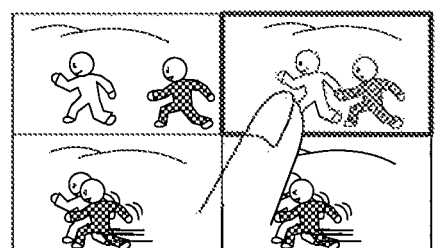
F I G. 1 5 D 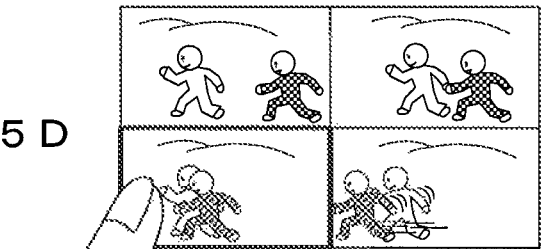
F I G. 1 5 E 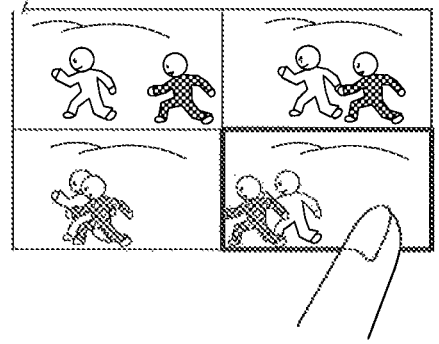

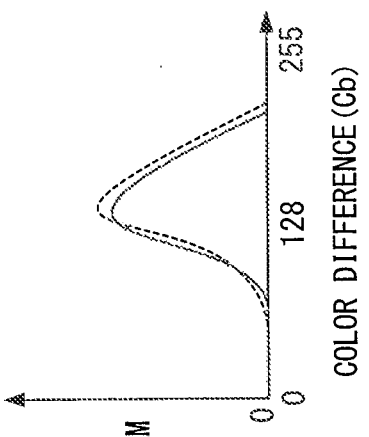
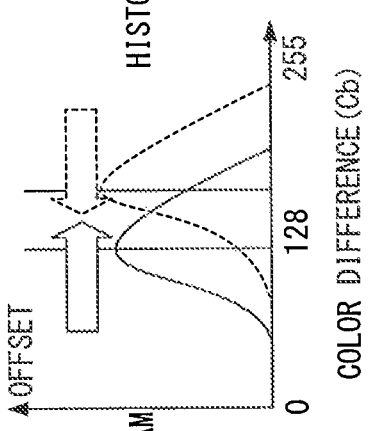
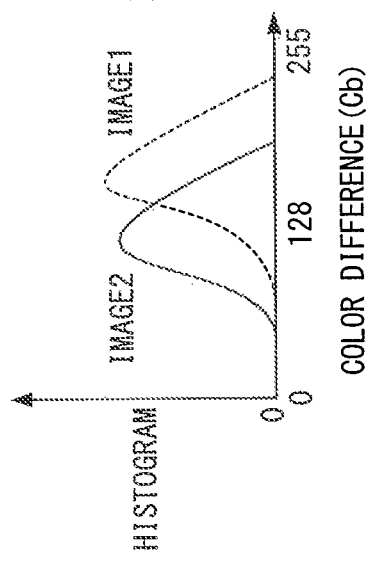
FIG. 16A  FIG. 16B  FIG. 16C
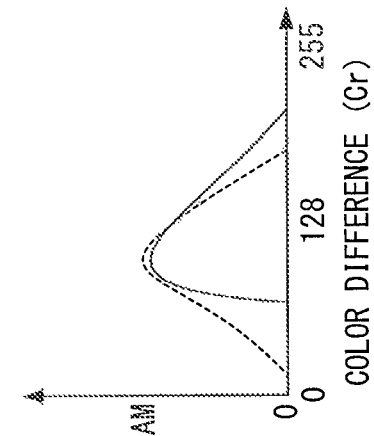
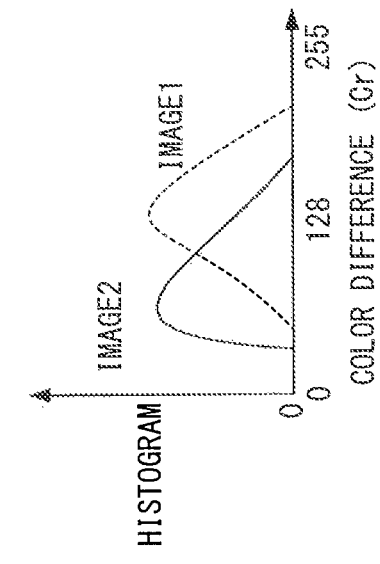
FIG. 16D  FIG. 16E  FIG. 16F

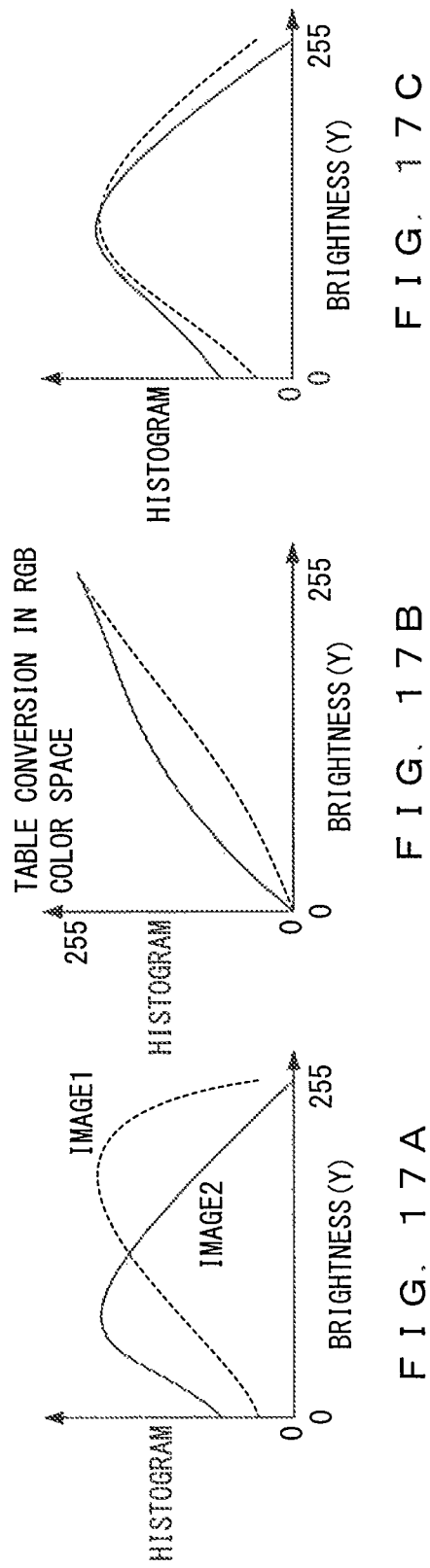

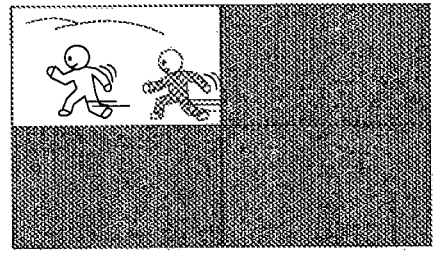
F I G. 1 8 A
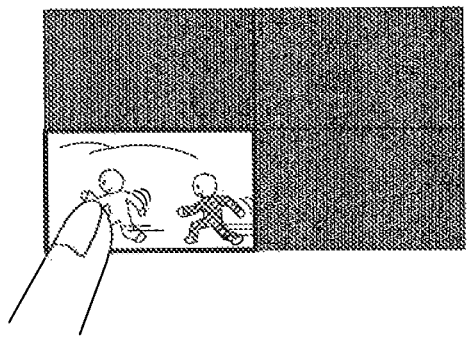
F I G. 1 8 B

| COMBINED IMAGE STORAGE AREA FOR DISPLAY AND RECORD |
|---|
| COMBINED IMAGE 1 |
| COMBINED IMAGE 2 |
| COMBINED IMAGE 3 |
| BLANK |
| BLANK |
| BLANK |
| BLANK |
| BLANK |

FIG. 20A

| COMBINED IMAGE STORAGE AREA FOR DISPLAY AND RECORD |
|---|
| COMBINED IMAGE 1 |
| BLANK |
| COMBINED IMAGE 3 |
| BLANK |
| COMBINED IMAGE 2 |
| BLANK |
| BLANK |

FIG. 20B

| COMBINED IMAGE STORAGE AREA FOR DISPLAY AND RECORD |
|---|
| COMBINED IMAGE 1 |
| COMBINED IMAGE 2 |
| COMBINED IMAGE 3 |
| BLANK |
| BLANK |
| BLANK |
| BLANK |
| BLANK |

FIG. 20C

F I G. 2 2 A 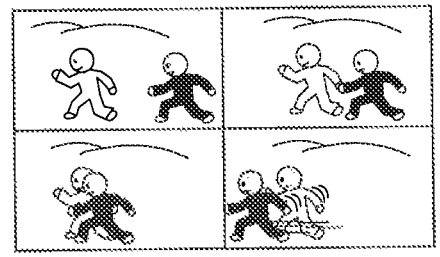
F I G. 2 2 B 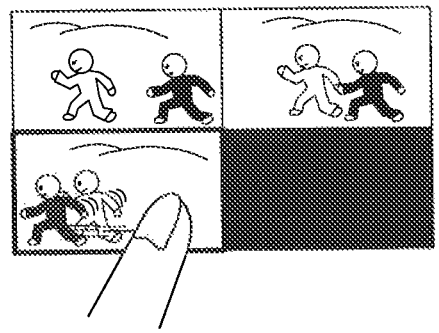

F I G. 2 5 A 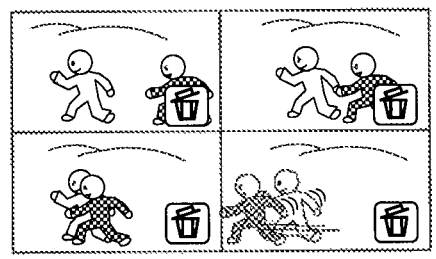
F I G. 2 5 B 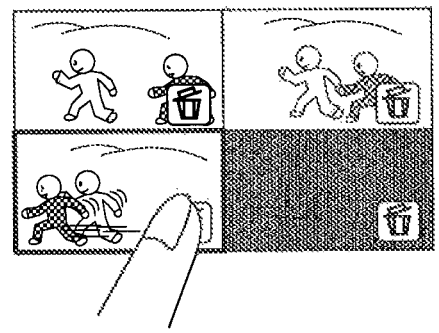

F I G. 26A 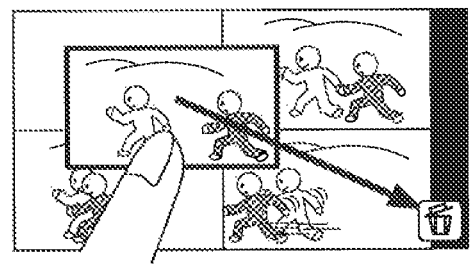
F I G. 26B 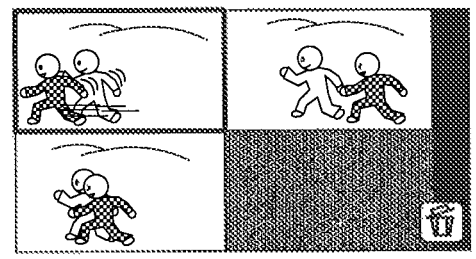

SHOOTING DEVICE, IMAGE PROCESSING METHOD, AND RECORDING MEDIUM

CROSS REFERENCE TO RELATED APPLICATION

This application is based upon and claims the benefit of priority from prior Japanese Patent Application No. 2012-152276, filed on Jul. 6, 2012, the entire contents of which are incorporated herein by this reference.

FIELD OF INVENTION

The present invention is related to a shooting device, an image processing method, and a recording medium for laying out a plurality of images obtained from plural times of shooting operations, and generating image data of combined images which configure a picture.

DESCRIPTION OF THE RELATED ART

A shooting device of a digital camera, a digital video camera, etc. stores or records an obtained image as digital data, and therefore easily processes the obtained image.

One of the uses of the shooting device which utilizes the above-mentioned feature is a combined picture. A combined picture refers to a composed picture obtained by laying out a plurality of pictures acquired by performing a shooting operation a plural number of times.

For more detail, a combined picture which is configured by a plurality of image is generated in order to express the feeling and imagination of a camera user at the shooting time with an image expressing a 3-dimensional view by different scenes or different viewpoints, a shot image depending on the time elapse, and a shot image of a mobile subject. Then, the camera user tries to transmit the feeling and imagination at the shooting time using the combined image. To attain this, the sequence and the arrangement order are assigned a scenario, and the scenario is very important in invoking the emotion of the viewer of the image.

A shooting device which acquires a combined picture generally belongs to a device which acquires a plurality of pictures configuring a combined picture by one shooting operation disclosed by, for example, Japanese Laid-open Patent Publication No. 2007-053616, or a device which acquires a plurality of pictures which configure a combined picture by the respective shooting operations as disclosed by, for example, Japanese Patent No. 4529561.

Japanese Laid-open Patent Publication No. 2007-053616 discloses a digital camera which continuously shoots images of a plurality of frames and lists the images of the plurality of frames. Japanese Patent No. 4529561 discloses a shooting device which composes and records the optimum image selected for each subject from among the images of a plurality of different subjects for each of which a plurality of images are shot.

SUMMARY

An aspect of the present invention provides a shooting device including: a display unit which is provided with a plurality of display areas; a first reception unit which receives a shoot instruction; a second reception unit which receives a cancel instruction that specifies a display area of the display unit; an image pickup unit which acquires an image by capturing a subject; a display control unit which controls the display unit so that an image displayed in a display area in a plurality of display areas is changed from a live view image to an image acquired by the image pickup unit at the shoot instruction when the first reception unit receives a shoot instruction, and an image displayed on the display area specified by the cancel instruction is changed to a specified image when the second reception unit receives the cancel instruction that specifies the display area in which the image acquired by the image pickup unit at the shoot instruction is displayed; and a combined image processing unit which combines image data of the plurality of images displayed on the plurality of display areas, and generates image data of a combined image which is laid out as being displayed on the display unit.

Another aspect of the present invention provides a shooting device which combines a plurality of still images obtained by performing a shooting operation plural number of times and generates a combined image. The shooting device includes: a specification unit which may specify one already captured still image; and a control unit capable of shooting again the still image specified by the specification unit.

A further aspect of the present invention provides an image processing method including: displaying a live view image in at least one display area of a display unit; receiving a shoot instruction; acquiring an image of a subject at the shoot instruction; changing the image displayed in one display area of at least one display area from the live view image to the image acquired at the shoot instruction; receiving a cancel instruction which specifies the display area in which the image acquired at the shoot instruction is displayed; changing the image displayed in the display area specified by the cancel instruction to a specified image; and combining image data of a plurality of images displayed in the plurality of display areas of the display unit, and generating image data of a combined image laid out as the plurality of images displayed on the display unit.

A further aspect of the present invention is a non-transitory recording medium which stores a program used to direct a computer provided with a display unit having a plurality of display areas to perform image processing including: displaying a live view image in at least one display area of a display unit; receiving a shoot instruction; acquiring an image of a subject at the shoot instruction; changing the image displayed in one display area of at least one display area from the live view image to the image acquired at the shoot instruction; receiving a cancel instruction which specifies the display area in which the image acquired at the shoot instruction is displayed; changing the image displayed in the display area specified by the cancel instruction to a specified image; and combining image data of a plurality of images displayed in the plurality of display areas of the display unit, and generating image data of a combined image laid out as the plurality of images displayed on the display unit.

BRIEF DESCRIPTION OF THE DRAWINGS

The present invention will be more apparent from the following detailed description when the accompanying drawings are referenced.

FIGS. 2A and 2B are flowcharts of the entire process of the camera according to the embodiment 1 of the present invention;

FIGS. 10A through 10D are explanatory views for explanation of the operation of a subject;

FIGS. 12A through 12E are other explanatory views of the shooting operation of the camera according to the embodiment 1 of the present invention;

FIGS. 15A through 15E are further explanatory views of the shooting operation of the camera according to the embodiment 1 of the present invention;

FIGS. 16A through 16F are explanatory views of the color change process performed by a combined image processing unit of the camera according to the embodiment 1 of the present invention;

FIGS. 17A through 17C are explanatory views of the brightness change process performed by a combined image processing unit of the camera according to the embodiment 1 of the present invention;

FIGS. 18A and 18B are explanatory views of the shot frame changing operation of the camera according to the embodiment 1 of the present invention;

FIGS. 20A through 20C are explanatory views of saving frame image data by a canceling operation and reconstructing frame image data by a reconstructing operation of the camera according to the embodiment 1 of the present invention;

FIGS. 22A and 22B are explanatory views of a canceling operation of the camera according to the embodiment 1 of the present invention;

FIGS. 25A and 25B are other explanatory views of the canceling operation of the camera according to the embodiment 1 of the present invention;

FIGS. 26A and 26B are further explanatory views of the canceling operation of the camera according to the embodiment 1 of the present invention;

DETAILED DESCRIPTION OF THE PREFERRED EMBODIMENTS

To obtain a desired combined picture, it is preferable that a user of a shooting device may select a plurality of pictures which configure a combined picture when the image data of the combined picture is generated, and it is preferable to be able to repeat the shooting operation unless the user of the shooting device obtain acceptable pictures which configure the combined picture.

However, by the technology disclosed by Japanese Laid-open Patent Publication No. 2007-053616 and Japanese Patent No. 4529561, it takes a lot of time and trouble to repeat the shooting operation for specific pictures which configure a combined picture.

To be concrete, since the digital camera disclosed by Japanese Laid-open Patent Publication No. 2007-053616 is configured to list a plurality of continuously shot images (that is, to display a combined picture), the user is unable to select a plurality of images which configure a combined picture.

The image pickup device disclosed by Japanese Patent No. 4529561 may select one image for each subject from among a plurality of images acquired for each subject. However, since the shooting step and the image selecting step are clearly separated, a picture of a specific subject is not separately shot again although it is known in selecting an image that there is no appropriate picture of the specific subject.

The above-mentioned technical problem is not caused only by a picture (that is, a still image), but may be caused by dynamic images. That is, the above-mentioned technical problem may generally occur on all images regardless of still images or dynamic images.

Each embodiment of the present invention is described below with reference to the attached drawings. In the present specification, a live view image refers to an image which may be acquired at any time by a live view function of a camera unlike an image which is acquired at an explicit shoot instruction from a user of the camera by, for example, a releasing operation.

Embodiment 1

Figure 1:
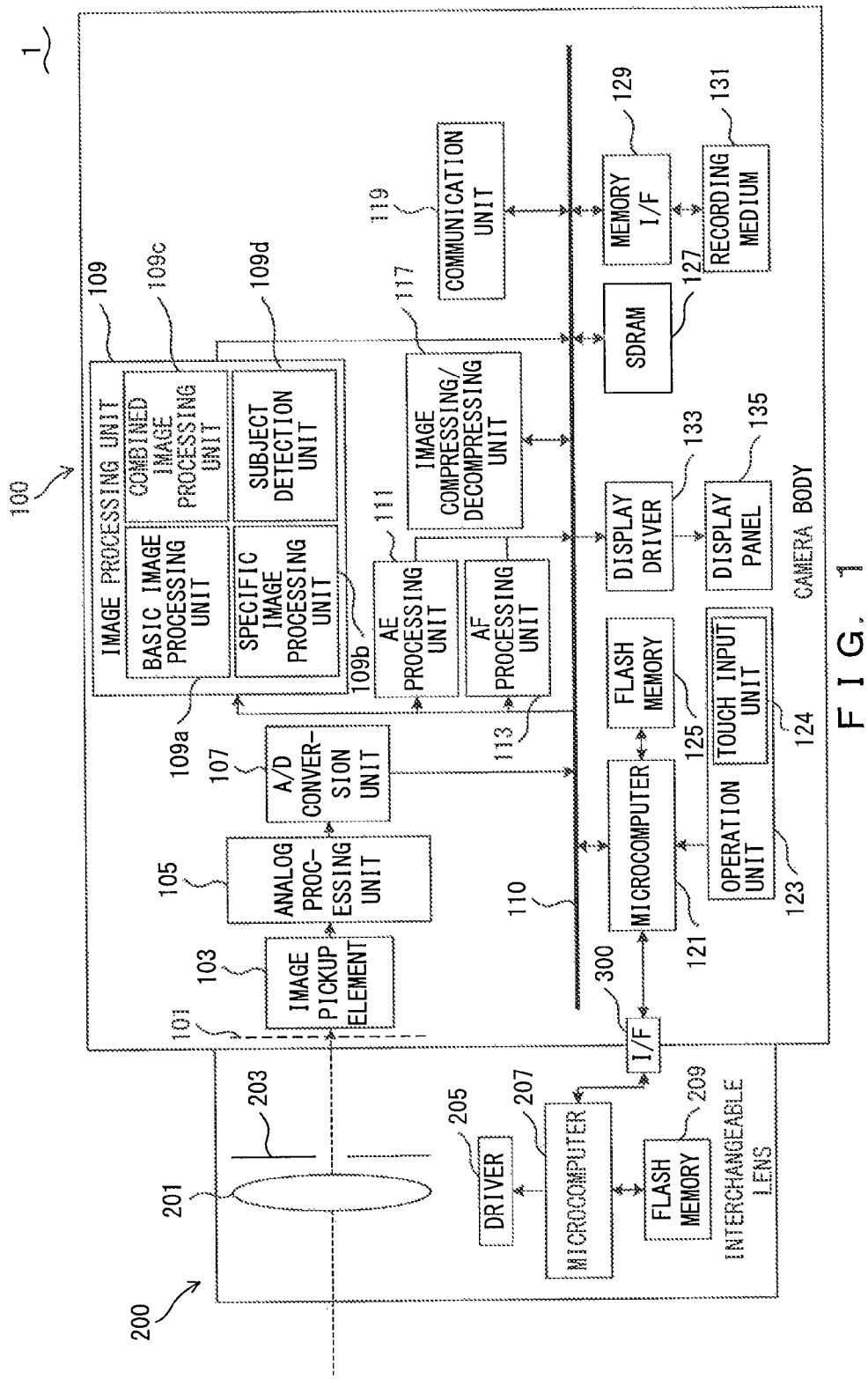
FIG. 1 is a block diagram of the entire configuration of mainly the electric system of the camera according to the embodiment 1 of the present invention.

FIG. 1 is a block diagram of the entire configuration of mainly the electric system of the camera according to the present embodiment.

A camera 1 exemplified in FIG. 1 is a shooting device for storing or recording an acquired image as digital data. A user of the camera 1 may specify that an image is acquired by a releasing operation using an operation unit 123 while observing a live view image displayed on a display panel 135 as a display unit. In addition to the function of acquiring a still image (that is, a picture) and dynamic images, the camera 1 has also the function of acquiring a combined image by laying out a plurality of still images and/or dynamic images.

First, the configuration of the camera 1 is described with reference to FIG. 1. The camera 1 includes a camera body 100 and an interchangeable lens 200 which includes a taking lens 201 and is removable from the camera body 100. Although the configuration of a camera whose taking lens may be exchangeable is exemplified in the present embodiment, the taking lens may be fixed to the body of the camera.

The interchangeable lens 200 includes the taking lens 201, a stop 203, a driver 205, a microcomputer 207, and flash memory 209. The camera body 100 and the interchangeable lens 200 are connected through an interface (hereafter referred to as an I/F) 300.

The taking lens 201 is configured by one or more optical lenses for forming an image of a subject, and is a single-focus lens or a zoom lens. The stop 203 is arranged after the optical axis of the taking lens 201. The stop 203 has a variable diameter, and limits the quantity of light of the luminous flux of a subject which passes through the taking lens 201. The taking lens 201 may be moved in the direction of the optical axis by the driver 205. According to the control signal from the microcomputer 207, the focus position of the taking lens 201 is controlled, and when the taking lens 201 is a zoom lens, the focal length is also controlled. The driver 205 also controls the diameter of the stop 203.

The microcomputer 207 connected to the driver 205 is also connected to the I/F 300 and the flash memory 209. The microcomputer 207 operates according to the program stored in the flash memory 209. The microcomputer 207 operating according to the program communicates with microcomputer 121 in the camera body 100 described later, and controls the interchangeable lens 200 according to the control signal from the microcomputer 121.

The flash memory 209 stores various types of information such as the optical feature, the adjustment value, etc. of the interchangeable lens 200 in addition to the above-mentioned program. The I/F 300 is an interface for communication between the microcomputer 207 in the interchangeable lens 200 and the microcomputer 121 in the camera body 100.

A mechanical shutter 101 is arranged on the optical axis of the taking lens 201 in the camera body 100. The mechanical shutter 101 controls the irradiation time of the luminous flux of a subject on an image pickup element 103 described later by cutting off a luminous flux of a subject. For example, a well-known focal plane shutter etc. may be adopted. The image pickup element 103 is arranged after the mechanical shutter 101 and at the position where the taking lens 201 forms a subject image.

A photodiode which configures each pixel is two-dimensionally arranged in a matrix array in the image pickup element 103. Each photodiode generates a photoelectric conversion current depending on the amount of photoreception, and the charge of the photoelectric conversion current is accumulated by the capacitor connected to each photodiode. An RGB filter of a Bayer array is arranged at the front surface of each pixel. The configuration of the image pickup element 103 is not limited to the configuration including the RGB filter arranged in the Bayer array. That is, for example, a plurality of sensors may be arranged in the direction of the thickness of an element such as FOVEON (registered trademark of Foveon, Inc.).

The image pickup element 103 is connected to an analog processing unit 105. The analog processing unit 105 performs waveform shaping the photoelectric conversion signal (hereafter referred to as an analog image signal) read from the image pickup element 103 after reducing the reset noise etc., and increases the gain so that a more appropriate brightness may be obtained. The analog processing unit 105 is connected to the A/D conversion unit 107. The A/D conversion unit 107 performs an analog-to-digital conversion on the analog image signal, outputs the obtained digital image signal (hereafter referred to as image data) to a bus 110, and stores the signal in SDRAM 127. That is, in the camera 1, the image pickup element 103, the analog processing unit 105, and the A/D conversion unit 107 function in all as an image pickup unit for capturing a subject and acquiring the image. In this specification, the raw image data before an image processing unit 109 performs image processing on the data is hereafter referred to as RAW data. The image pickup element 103 has a built-in electronic shutter, and uses the electronic shutter to capture an image while releasing the mechanical shutter 101 when an image is repeatedly captured as when dynamic images are captured and a live view image is captured.

The bus 110 is a transfer path for forwarding inside the camera body 100 various types of data read or generated in the camera body 100. Connected to the bus 110 are, in addition to the above-mentioned A/D conversion unit 107, the image processing unit 109, an AE (auto exposure) processing unit 111, an AF (auto focus) processing unit 113, an image compressing/decompressing unit 117, a communication unit 119, a microcomputer 121, SDRAM (synchronous DRAM) 127, a memory interface (hereafter referred to as a memory I/F) 129, and a display driver 133.

The image processing unit 109 includes a basic image processing unit 109a for performing basic image processing, a specific image processing unit 109b for applying a specific effect when a mode in which a specific effect such as an art filter etc. is applied is set, a combined image processing unit 109c for generating the image data of a combined image; and a subject detection unit 109d for detecting a subject by analyzing image data in a pattern matching process etc. The image processing unit 109 reads the image data temporarily stored in the SDRAM 127, and performs the image processing on the image data.

The basic image processing unit 109a performs on the RAW data an optical black (OB) subtraction process, a white balance (WB) correction, a synchronization process performed for Bayer data, color reproduction process, a gamma correction process, a brightness change process, an edge emphasis process, a noise reduction (NR) process, etc.

The specific image processing unit 109b performs a specific image processing of applying various visual specific effects on the image data processed by the basic image processing unit 109a depending on the set specific effect (art filter) etc. For example, when a toy photo is set, the specific image processing unit 109b performs a process of adding shading. Furthermore, when a fantastic focus, a rough monochrome, a diorama, and a crystal are set, the specific image processing unit 109b performs a soft focus process, a noise superposition process, an airbrushing process, a cross-filter process.

The combined image processing unit 109c combines plural pieces of image data, and generates image data of a combined image as an image obtained by laying out in a specified array a plurality of images corresponding to the plural pieces of image data. The plural pieces of image data to be combined are image data processed by at least the basic image processing unit 109a, and when a specific effect is set, the image data processed by the basic image processing unit 109a and the specific image processing unit 109b are combined.

Furthermore, the combined image processing unit 109c corrects each image (hereafter referred to as a frame image) which configures the combined image and has been processed by the basic image processing unit 109a and the specific image processing unit 109b before the image data are combined. Concretely, the combined image processing unit 109c analyzes the plural pieces of image data processed by the basic image processing unit 109a and the specific image processing unit 109b, and calculates a difference in color distribution, brightness average, etc. between the images. Then, the combined image processing unit 109c corrects, based on calculated information, the color and the brightness of each frame image which configures the combined image so that the combined image may be in the optimum state. By the combined image processing unit 109c correcting the frame image and performing the adjusting process between the images, the user may obtain a better image as a combined image.

The subject detection unit 109d performs a process of detecting a specified subject, for example, the face of a person, an animal such as a pet etc. by analyzing an image using a pattern matching technique etc. Furthermore, a process of calculating the type, size, position, etc. of the detected subject may be performed. The detection result may be used in switching a shooting mode, autofocus, auto-zoom for shooting a subject image in a constant size, etc.

The AE processing unit 111 measures the brightness of a subject based on the image data input through the bus 110, and outputs the measured subject brightness information to the microcomputer 121 through the bus 110. In this example, the AE processing unit 111 calculates the brightness of a subject based on the image data, but the function may be realized by providing a dedicated photometry sensor for the camera 1 to measure the brightness of a subject.

The AF processing unit 113 extracts a signal of a high-frequency component from image data, and acquires a focusing evaluation value in a multiplying process. The AF processing unit 113 outputs the acquired focusing evaluation value to the microcomputer 121 through the bus 110. That is, the camera 1 adjusts the focus of the taking lens 201 in a so-called contrast method.

When image data is stored in a recording medium 131 connected to the memory I/F 129, the image compressing/decompressing unit 117 compresses the image data read from the SDRAM 127 in the JPEG compression system etc. for still images or in various compression system such as MPEG etc. for dynamic images.

The microcomputer 121 adds to the JPEG image data and the MPEG image data a necessary header for configuring a JPEG file, an MPO file, and an MPEG file, and generates the JPEG file, the MPO file, and the MPEG file. The microcomputer 121 records the generated file in the recording medium 131 through the memory I/F 129.

The image compressing/decompressing unit 117 also decompresses the JPEG image data and the MPEG image data for playback and display of images. In decompressing data, a file stored in the recording medium 131 is read, decompressed by the image compressing/decompressing unit 117, and temporarily stored in the SDRAM 127. The present embodiment exemplifies as an image compressing system the JPEG compression system and the MPEG compression system, but the compression system is not limited to them, and other compression systems such as a TIFF system, an H.264 system, etc. may be used.

The communication unit 119 communicates with external equipment to update and add a template stored in the flash memory 125 described later. The communication unit 119 may be connected to the external equipment through a cable LAN or a wireless LAN, and also be connected to the external equipment through a USB cable etc.

The microcomputer 121 functions as a control unit of the entire camera 1, and generally controls various sequences of the camera. In addition to the above-mentioned I/F 300, the operation unit 123 and the flash memory 125 are connected to the microcomputer 121.

The operation unit 123 includes operation members including various input buttons and input keys such as a power supply button, a release button, a dynamic image button, a playback button, a menu button, a cross button, an OK button, a mode dial, etc. The operation unit 123 detects the operation state of these operation members, and outputs the detection result to the microcomputer 121. The microcomputer 121 executes various sequences depending on the user operation based on the detection result of the operation members from the operation unit 123. That is, the operation unit 123 of the camera 1 functions as a receiving unit for receiving various instructions (for example, a shoot instruction, a cancel instruction, a reconstruct instruction, a playback instruction, etc.) from the user.

The power supply button is an operation member for specifying ON/OFF of the power supply of the camera 1. When the power supply button is pressed, the camera 1 is powered up. When the power supply button is pressed again, the camera 1 is powered off.

The release button is configured by a first release switch for power-on when a user half presses the switch, and a second release switch for power-on when the user further presses the switch from the half-pressed state to the fully-pressed state. When the first release switch is turned on, the microcomputer 121 performs the shooting preparation sequence such as an AE operation, an AF operation, etc. Furthermore, when the second release switch is turned on, the microcomputer 121 performs shooting by executing a series of shooting sequences which controls the mechanical shutter 101 etc., acquires image data based on the subject image from the image pickup element 103 etc., and stores the image data in the recording medium 131.

The playback button is an operation button for setting and releasing the playback mode. When the playback mode is set, the microcomputer 121 reads the image data of a shot image from the recording medium 131, and plays back and displays the image on the display panel 135.

The menu button is an operation button for display of the menu screen on the display panel 135. On the menu screen, the user may make various settings of the camera. The setting of a camera may be a setting of a specific effect (art filter). A specific effect may be a fantastic focus, pop art, toy photo, rough monochrome, diorama, etc. In addition, a combined image may also be set on the menu screen.

The mode dial is to select a shooting mode. In the camera 1, the operation mode is switched between the normal mode in which a normal shooting is performed and the combined image mode in which a combined image is shot by a user operates the mode dial. The switching between the normal mode and the combined image mode may be performed by a user on the menu screen etc.

The operation unit 123 further includes a touch input unit 124. The touch input unit 124 is a touch panel sensor arranged as, for example, overlapping the display panel 135. The touch input unit 124 detects a touching operation by a user on the display panel 135, and outputs the detection result to the microcomputer 121. The microcomputer 121 executes various sequences depending on the operation of a user based on the detection result of the touch input unit 124 from the operation unit 123.

The operation unit 123 may include the above-mentioned various buttons on the display panel 135. That is, instead of providing a button physically on the surface of the camera 1, the microcomputer 121 may display a button on the display panel 135 and detect an operation by the touch input unit 124 on the button displayed on the display panel 135. Instead of displaying the release button on the display panel 135, the display panel 135 may function as a release button. In this case, the microcomputer 121 may assume that the release button is half pressed when a user touches the display panel 135, and that the release button is fully pressed when the user continuously touches the panel for a specified time (for example, 1 second). Otherwise, the microcomputer 121 may assume that the release button is half pressed and then fully pressed when a user touches the panel.

Flash memory 125 stores a program for executing various sequences of the microcomputer 121. The microcomputer 121 controls the entire camera according to the program stored in the flash memory 125. Furthermore, the flash memory 125 stores various adjustment values such as a color matrix coefficient, an R gain and a B gain depending on the white balance mode, values for a gamma table, an exposure condition determination table, etc. Furthermore, the flash memory 125 stores as a template the information about the style of a combined image, that is, how the frame images configuring the combined image are laid out.

The SDRAM 127 is volatile memory which may be electrically written for temporarily storing image data etc. The SDRAM 127 temporarily stores the image data output from the A/D conversion unit 107 and the image data processed by the image processing unit 109, the image compressing/decompressing unit 117, etc.

The memory I/F 129 is connected to the recording medium 131. The memory I/F 129 controls a write and a read to and from the recording medium 131 for data such as image data and a header added to the image data, etc. The recording medium 131 is a recording medium such as a memory card freely attached to and detached from the camera body 100. However, the recording medium is not limited to them, but may be a built-in non-volatile memory and hard disk in the camera body 100.

The display driver 133 is connected to the display panel 135. The display driver 133 displays an image on the display panel 135 based on the image data read from the SDRAM 127 and the recording medium 131, and decompressed by the image compressing/decompressing unit 117. The display panel 135 is, for example, a liquid crystal display (LCD) provided on the back of the camera body 100, and displays an image. The image display may be a REC view display for displaying stored image data for a short time immediately after shooting, a playback display of an image file of still images and dynamic images stored in the recording medium 131, and a dynamic image display such as a live view display, etc. The display panel 135 may be an organic EL in addition to the LCD, and other display panel may be adopted. In addition, when the shooting mode is a combined image mode, a plurality of areas (hereafter referred to as display areas) for display of an image is defined for the display panel 135. The layout of the plurality of display areas depends on the style of a combined image.

Next, the process performed by the camera 1 configured as described above is explained below with reference to FIGS. 2A through 9. The process of the camera illustrated in the flowchart in FIGS. 2A through 9 is performed by the microcomputer 121 executing the program stored in the flash memory 125. First explained is the flow of the entire process of the camera illustrated in FIGS. 2A and 2B. The program may be stored in the recording medium 131 instead of the flash memory 125, and the microcomputer 121 may read and execute the program stored in the recording medium 131.

Figure 2A:
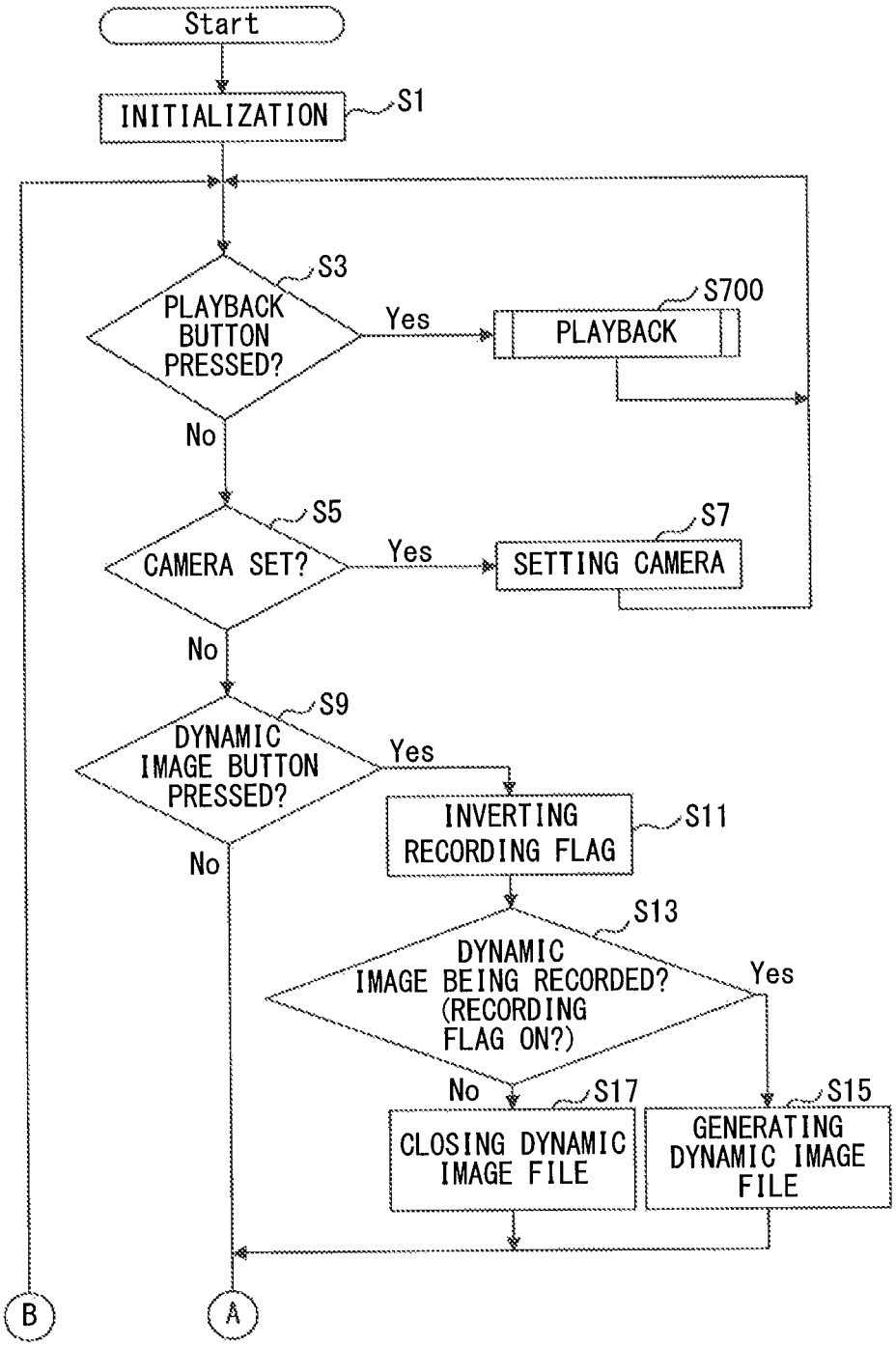

When the camera 1 is turned on by operating the power supply button in the operation unit 123, and the process of the camera 1 illustrated in FIGS. 2A and 2B is started, the microcomputer 121 initializes the camera 1 (step S1). In this process, mechanical initialization and electric initialization such as the initialization of various flags etc. are performed. A flag to be initialized is, for example, a recording flag indicating whether or not dynamic images are being recorded, and the recording flag is set in the OFF position by the initialization. A simple process setting is also set in the OFF position.

When the initialization is completed, the microcomputer 121 judges whether or not the playback button has been pressed (step S3). In this step, the operation state of the playback button in the operation unit 123 is detected and judged. When the playback button is displayed on the display panel 135, the signal from the touch input unit 124 is detected and judged. When the playback button is pressed, the microcomputer 121 sets the playback mode as an operation mode, and performs the playback process (step S700). When the playback mode is completed, the process in step S3 is performed again. The details of the playback process are described later with reference to FIG. 9.

If it is judged in step S3 that the playback button is not pressed, the microcomputer 121 judges whether or not the menu button has been pressed, that is, whether or not the menu screen has been displayed and the state in which the camera is set has been entered (step S5). In this step, the operation state of the menu button in the operation unit 123 is detected and judged. If the menu button has been displayed on the display panel 135, the signal from the touch input unit 124 is detected and judged.

When the menu button is pressed, the microcomputer 121 detects a further operation on the operation unit 123, and changes the camera setting depending on the detection result (step S7). When the camera setting process is completed, the process in step S3 is performed again.

The camera setting may be, for example, a shooting mode setting, a record mode setting, an image finish setting, a combined image style setting, a setting of selecting an image which is acquired in advance and to be incorporated into a combined image, a setting as to whether or not a frame image is to be recorded, etc. The shooting mode may be a normal shooting mode and a combined image mode. The record mode may be a JPEG record mode, a JPEG+RAW record mode, a RAW record mode, etc. as a still image record mode, and a motion-JPEG mode, an H.264 mode, etc. as a dynamic image record mode. Furthermore, the image finish setting may be a natural image setting (Natural), a vivid image setting (Vivid), a flat image setting (Flat), a specific effect setting such as an art filter, etc.

When it is judged in step S5 that the menu button has not been pressed, the microcomputer 121 judges whether or not the dynamic image button has been pressed (step S9). In this step, the operation state of the dynamic image button in the operation unit 123 is detected and judged. If the dynamic image button is displayed on the display panel 135, a signal from the touch input unit 124 is detected and judged.

If it is judged that the dynamic image button has not been pressed, the microcomputer 121 performs the process in step S19. On the other hand, if the dynamic image button is pressed, the microcomputer 121 inverts the recording flag (step S11). That is, if the recording flag is OFF, it is changed into ON, and if the recording flag is ON, it is changed into OFF. Furthermore, the microcomputer 121 judges based on the state of the inverted recording flag whether or not an image is being recorded (step S13).

If it is judged that the recording flag is ON, the microcomputer 121 judges that an instruction to start recording dynamic images has been issued, generates a dynamic image file (step S15), and prepares for recording the image data. The process is performed when, for example, the dynamic image button has first pressed after the power supply is turned on. After generating the dynamic image file, the process in step S19 is performed.

When it is judged in step S13 that the recording flag is OFF, the microcomputer 121 judges that an instruction to terminate dynamic image recording has been issued, and closes the dynamic image file (step S17). That is, the dynamic image file is placed in a state in which the file may be played back by performing the process of recording the number of frames in the header of the dynamic image file, thereby terminating the writing process. After terminating the write to the dynamic image file, the process in step S19 is performed.

In step S19, the microcomputer 121 judges whether or not the shooting mode is the combined image mode, and whether or not a specified combined image operation has been performed on the operation unit 123. In this process, the setting of the shooting mode stored in the SDRAM 127 and the operation state of the operation unit 123 are detected and judged.

If it is judged that a specified operation has been performed in the combined image mode, the microcomputer 121 performs the combined image operating process (step S600). When the combined image operating process is completed, the process in step S21 is performed again. The details of the combined image operating process are described later with reference to FIGS. 8A and B.

If it is judged in step S19 that the shooting mode is not the combined image mode, or that the specified combined image operation is not performed on the operation unit 123, the microcomputer 121 judges whether or not the release button has been half pressed (step S21). In this step, the transition from OFF to ON of the first release switch which cooperates with the release button is detected and judged. When the release button is displayed on the display panel 135 or the display panel 135 functions as a release button, a signal indicating that the area in which the release button is displayed or the display area displaying the live view image has been touched is detected and judged.

If the release button is half pressed, the microcomputer 121 performs the AE and AF operations (S23). In this process, the AE operation is performed by the AE processing unit 111 detecting the brightness of a subject based on the image data acquired by the image pickup element 103, and calculating the shutter speed, the stop value, etc. for the appropriate exposure based on the brightness of a subject. The AF operation is performed by the driver 205 moving the focal position of the taking lens 201 through the microcomputer 207 in the interchangeable lens 200 so that the focusing evaluation value acquired by the AF processing unit 113 may be the peak value. When the AF operation is performed according to the signal from the touch input unit 124, the taking lens 201 is moved so that the focus is gained on the subject displayed in the touch position. After the AE and AF operations, the process in step S25 is performed. The AF operation may be performed in various AF systems such as a phase difference AF using a dedicated sensor in addition to the so-called contrast AF above.

If it is judged in step S21 that the release button has not been half pressed, the microcomputer 121 judges whether or not the release button has been fully pressed (step S27). In this step, the transition of the second release switch from OFF to ON is detected and judged. The microcomputer 121 may perform continuous shooting by continuously detecting and judging that the second release switch is in the ON state. Furthermore, when the release button is displayed on the display panel 135 or when the display panel 135 functions as a release button, the microcomputer 121 detects and judge the signal indicating that the area in which the release button is displayed or the display area in which the live view image is displayed has been touched.

When the release button is fully pressed, the microcomputer 121 performs still image shooting by a mechanical shutter (S29). In this process, the stop 203 is controlled by the stop value calculated in step S23, and the shutter speed of the mechanical shutter 101 is controlled at the calculated shutter speed. If the exposure time depending on the shutter speed has passed, an image signal is read from the image pickup element 103, and the RAW data processed by the analog processing unit 105 and the A/D conversion unit 107 is temporarily stored in the SDRAM 127 through the bus 110.

Afterwards, the microcomputer 121 reads the RAW data temporarily stored in the SDRAM 127, allows the image processing unit 109 to perform the image processing (step S100a), and performs the still image recording process for recording processed image data etc. in the recording medium 131 (step S500). The image processing and the still image recording process are described later in detail with reference to FIGS. 3 through 6, and 7.

When the still image recording process is completed, the microcomputer 121 judges whether or not the shooting mode is a combined image mode (step S31). In this step, the judgment is made by setting the shooting mode stored in the SDRAM 127.

If the shooting mode is not the combined image mode, that is, the shooting mode is a normal shooting mode, the microcomputer 121 performs the process in step S25. On the other hand, if the shooting mode is a combined image mode, the microcomputer 121 changes the live view display (step S33). In the camera 1, when the shooting mode is a combined image mode, the display panel 135 includes a plurality of display areas, and a live view image is displayed in one of the display areas in the process in step S39 described later. In the changing process of the live view display in step S33, the display driver 133 controls the display panel 135 under the control of the microcomputer 121 so that the display area in which a live view image is displayed is changed. To be more concrete, the image displayed in the display area in which the live view image has been displayed is and changed into the image shot in step S29 and processed in step S100a. Furthermore, the display area in which the live view image is displayed is switched so that the live view image is displayed in another display area. That is, in the camera 1, the microcomputer 121 and the display driver 133 function as a display control unit for controlling the display panel 135. After the live view display process, the microcomputer 121 performs the process in step S25.

If it is judged in step S27 that the release button has not been fully pressed, the microcomputer 121 performs the AE operation on dynamic images or live view images (step S35). The AE operation is performed by the AE processing unit 111 calculating the shutter speed of the electronic shutter and the ISO sensitivity of the image pickup element 103 for live view display with the appropriate exposure.

After the AE operation, the microcomputer 121 performs shooting using an electronic shutter (step S37). In this step, an image signal is read from the image pickup element 103 using an electronic shutter, and the RAW data processed by the analog processing unit 105 and the A/D conversion unit 107 is temporarily stored in the SDRAM 127 through the 110.

Afterwards, the microcomputer 121 reads the RAW data temporarily stored in the SDRAM 127, and allows the image processing unit 109 to perform identical image processing as in the case of shooting an image using a mechanism shutter (step S100b). Furthermore, under the control of the microcomputer 121, the display driver 133 controls the display panel 135 so that the image in the display area in which a live view image is displayed is changed into the image data acquired in step S37 and processed in step S100b, thereby updating the live view image (step S39).

When the live view image is updated, the microcomputer 121 judges whether or not dynamic images are being recorded (step S41). In this step, the judgment is made by the state of the recording flag stored in the SDRAM 127.

When the recording flag is OFF, the microcomputer 121 performs the process in step S25. On the other hand, when the recording flag is ON, the microcomputer 121 judges that dynamic images are being recorded, and records the dynamic images (step S43). That is, the image data of the live view image updated in step S39 is stored as a frame image of the dynamic image file generated in step S15. Afterwards, the microcomputer 121 performs the process in step S25.

In step S25, the microcomputer 121 judges whether or not the power supply is OFF.

If the power supply is ON, the microcomputer 121 performs the process in step S3. When it is OFF, the microcomputer 121 performs a necessary terminating process, thereby terminating the process of the camera 1.

Using the camera 1 which operates as described above, when a subject which moves with the lapse of time is shot in the combined image mode as illustrated in FIGS. 10A through 10D, the user easily acquires a frame image which configures a combined image only by touching the display area in which the live view image is displayed as illustrated in FIGS. 11A through 11E, and changes the image displayed in the touched display area from the live view image to the acquired frame image. That is, the operation of the user touching the live view image corresponds to a shoot instruction. Furthermore, since the area in which the live view image is displayed is automatically switched, and the live view image is displayed in another display area in which a frame image is not displayed (when an image which is to be incorporated into a combined image and acquired in advance is set, another display area in which the frame image and the image acquired in advance are not displayed), the user may quickly acquire the next frame image without losing the chance to operate the shutter although the subject is moving. Furthermore, since the live view image is displayed in one display area in a plurality of display areas defined on the display panel 135, the camera 1 may provide a user with the environment in which the user may concentrate on the shooting operation.

Furthermore, the camera 1 may display a mark ("LV" in this case) indicating the live view image in the display area in which the live view image is displayed as exemplified in FIGS. 12A through 12E to discriminate the live view image from the frame image. Thus, although it is difficult to discriminate the live view image from the frame image in such a case in which a subject does not change with time is to be shot, etc., the user may easily specify the live view image. Furthermore, in the display area in which a frame image is displayed, a mark ("1", "2", "3", "4" in this case) indicating the order of acquiring the frame image may be displayed. Thus, although there are a number of display areas, the user may easily grasp the order in which the frame image has been acquired.

In addition, the camera 1 may display a frame image darker than the live view image or in lower color saturation as exemplified in FIGS. 13A through 13E to discriminate the live view image from the frame image. FIGS. 11A through 11E exemplify a user instruction to shoot an image by a touching operation, but the camera 1 similarly operates by the operations of the cross key and the release button.

Furthermore, FIGS. 11A through 11E exemplify the definition of four (2×2) display areas on the display panel 135, the layout of the display areas is not limited to this example. Since the layout of the display areas is designed by the style of a set combined image, for example, various types of layout may be selected as illustrated in FIGS. 14A through 14K by changing the settings of the styles of the combined image. In FIGS. 14A through 14J, although a plurality of display areas are arranged so that the areas do not overlap one another, the display areas partly overlap other display areas in FIG. 14K.

Figure 14A:
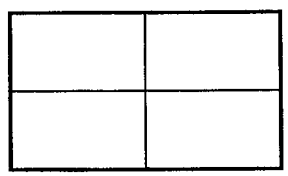
FIGS. 14A through 14K are explanatory views of the layout of a display area.
Figure 14B:
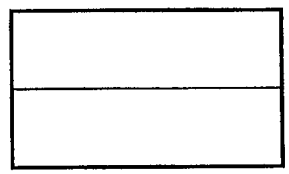
Figure 14C:
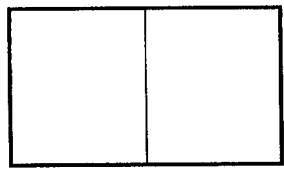
Figure 14D:
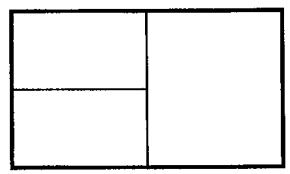
Figure 14E:
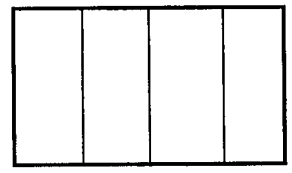
Figure 14F:
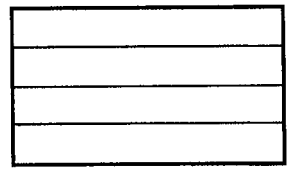
Figure 14G:
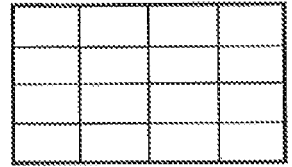
Figure 14H:
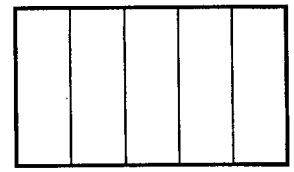
Figure 14I:
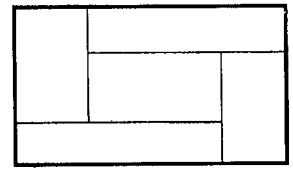
Figure 14J:
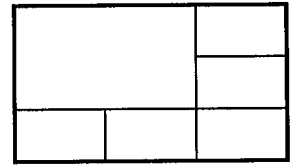
Figure 14K:
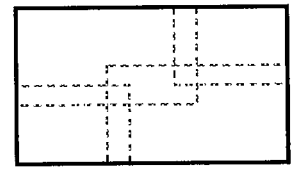

When the layout in FIG. 14K is used, the image displayed in each display area is displayed with the density gradually reduced toward the periphery, thereby disappearing the boundary of each image.

In FIGS. 11A through 11E, although the live view image is displayed only in one display area of a plurality of display areas defined on the display panel 135, the camera 1 may display a live view image in a plurality of or all display areas excluding the display area in which the frame image is displayed as illustrated in FIGS. 15A through 15E. When the live view image is displayed in all display areas, since it is not necessary to consider the time in which the display areas of the live view image are switched, the camera 1 may acquire a plurality of frame images by continuously touching a plurality of display areas while sliding the finger on the display areas. Therefore, a new operation technique that is not obtained by a conventional camera may be provided for a user.

Next, the image processing performed after shooting an image using a mechanical shutter or an electronic shutter illustrated in FIGS. 2A and 2B is described below in more detail with reference to FIGS. 3 through 6. The target of the image processing performed after shooting an image using a mechanical shutter is RAW data acquired by the shooting using a mechanical shutter, and the target of the image processing performed after shooting an image using an electronic shutter is RAW data acquired by the shooting using an electronic shutter.

Figure 3:
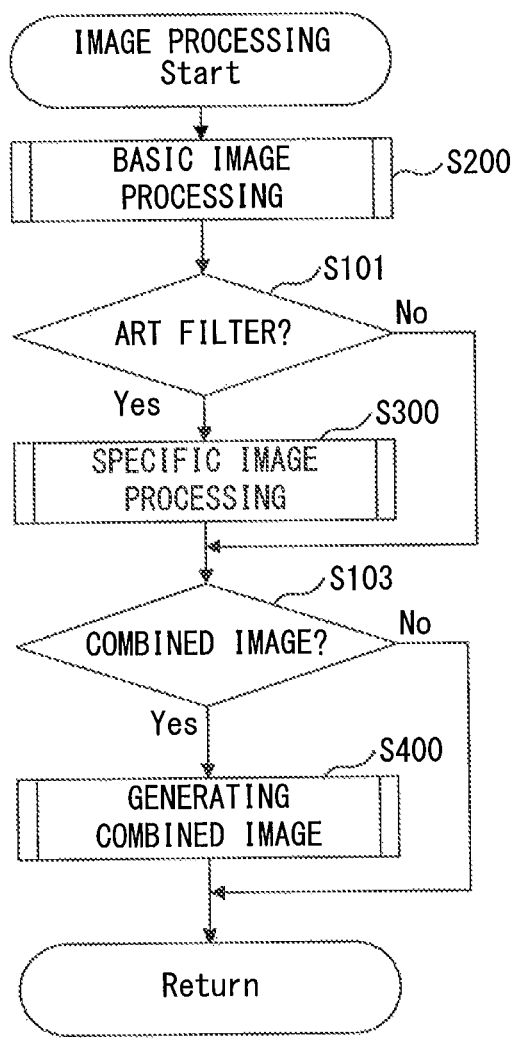
FIG. 3 is a flowchart of the image processing of the camera according to the embodiment 1 of the present invention.

As illustrated in FIG. 3, the image processing is configured mainly by the basic image processing performed by the basic image processing unit 109a, the specific image processing performed by the specific image processing unit 109b, and the combined image generating process performed by the combined image processing unit 109c.

When the microcomputer 121 reads the RAW data temporarily stored in the SDRAM 127 and instructs the image processing unit 109 to perform the image processing, the basic image processing unit 109a performs the basic image processing the read RAW data (step S200).

Figure 4:
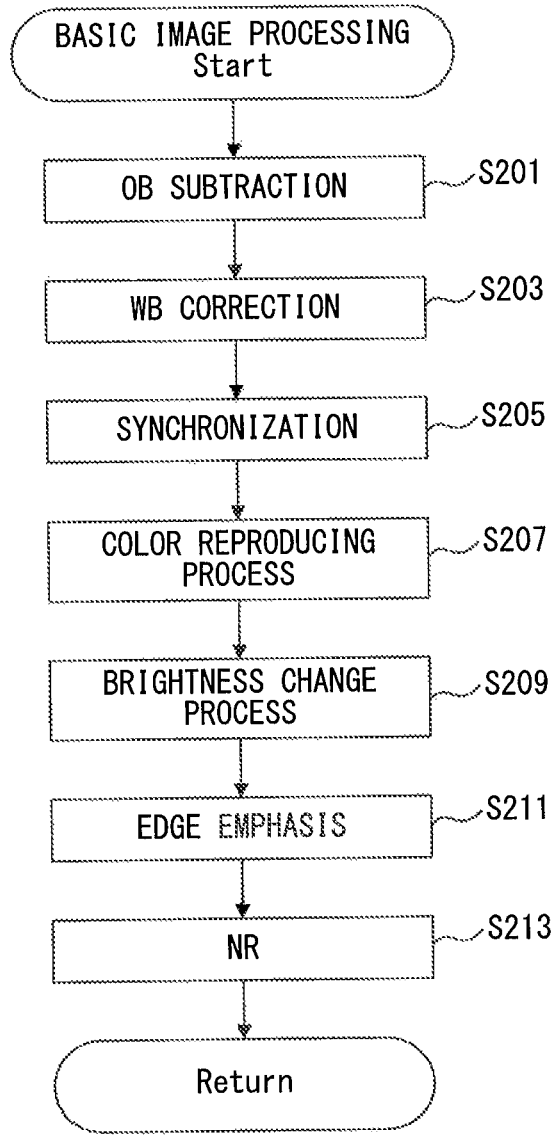
FIG. 4 is a flowchart of the basic image processing of the camera according to the embodiment 1 of the present invention.

The basic image processing performed by the basic image processing unit 109a is configured by seven image processing steps as illustrated in FIG. 4. First, an optical black (OB) subtraction is performed (step S201). In this step, the OB operation unit in the basic image processing unit 109a subtracts the optical black value caused by the dark current etc. of the image pickup element 103 from the pixel value of each pixel configuring the image data.

The basic image processing unit 109a performs a white balance (WB) correction after the OB subtraction (step S203). In this step, the WB correction unit in the basic image processing unit 109a performs the WB correction on the image data depending on the white balance mode. Concretely, the correction is made by reading the R gain and the B gain depending on the white balance mode set by a user from the flash memory 125 of the camera body, and multiplying the image data by the read value. Otherwise, when the auto white balance is performed, the R gain and the B gain are calculated from the RAW data, and a correction is made using the calculation result.

Then, the basic image processing unit 109a performs the synchronization process (step S205). In this step, the synchronization process unit in the basic image processing unit 109a converts the data (Bayer data) of each pixel into the RGB data on the image data processed by the white balance correction. Concretely, the data missed in the pixel is obtained from the periphery by interpolation, and converted into RGB data. This step is omitted when there are plural pieces of data per pixel in the RAW data such as when an image pickup element in the FOVEON (registered trademark of Foveon, Inc.) format is used as the image pickup element 103.

The basic image processing unit 109a performs the color reproducing process after performing the synchronization process (step S207). In this step, the color reproducing process unit in the basic image processing unit 109a corrects the color of image data by performing a linear conversion of multiplying the image data by a color matrix coefficient depending on the set white balance mode. Since the color matrix coefficient is stored in the flash memory 125, it is read and used.

The basic image processing unit 109a performs the brightness change process after the color reproducing process (step S209). In this step, the brightness change process unit in the basic image processing unit 109a performs the gamma correction process on the image data (RGB data). Then, a color conversion is made from the RGB to YCbCr data, and the gamma correction is performed on the Y data of the converted image data. In the gamma correction, a gamma table stored in the flash memory 125 is read and used.

The basic image processing unit 109a performs an edge emphasis after the brightness change process (step S211). In this step, the edge emphasis process unit in the basic image processing unit 109a extracts the edge component from the image data by a band pass filter, performs a multiplication by a coefficient depending on an edge emphasis level, and adds the result to the image data, thereby emphasizing the edge of the image data.

Finally, the basic image processing unit 109a performs an NR (noise removal) (step S213). In this step, the NR unit in the basic image processing unit 109a performs a frequency analysis on the image, and performs core processing depending on the frequency, thereby reducing the noise.

When the basic image processing is completed, and if a specific effect (art filter) is set, the specific image processing unit 109b performs the specific image processing on the image data processed by the basic image processing unit 109a (steps S101 and S300 in FIG. 3).

Figure 5:
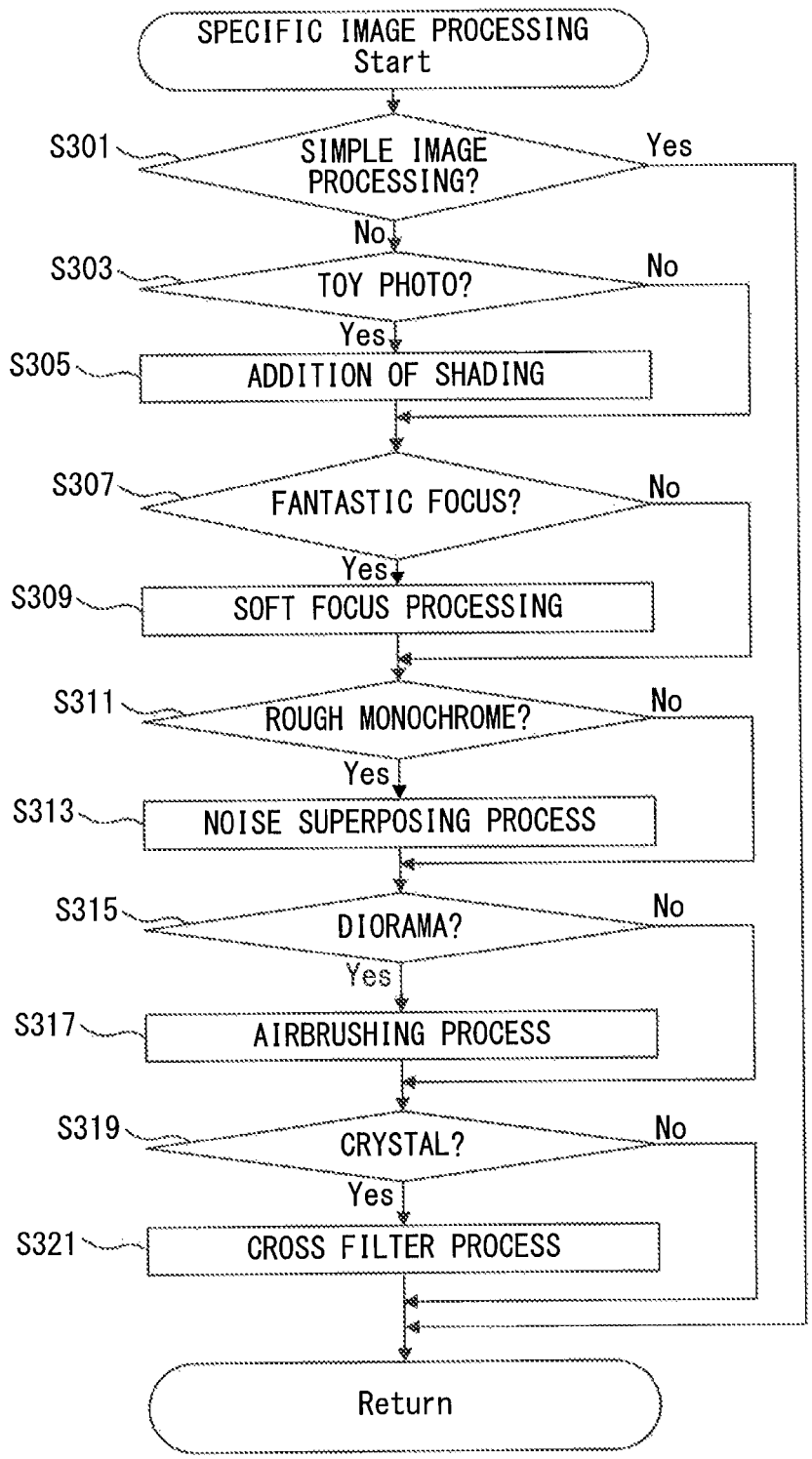
FIG. 5 is a flowchart of the specific image processing of the camera according to the embodiment 1 of the present invention.

The specific image processing performed by the specific image processing unit 109b is configured mainly by five image processing steps performed depending on the setting of the specific effect as illustrated in FIG. 5. First, the specific image processing unit 109b judges whether or not the simple image processing is set (step S301). In this step, the specific image processing unit 109b judges depending on the state of the simple process setting stored in the SDRAM 127. When the simple process setting is ON, the specific image processing is terminated.

When the simple process setting is OFF, the specific image processing unit 109b sequentially judges whether or not a toy photo, a fantastic focus, a rough monochrome, a diorama, and a crystal are set as a specific effect (art filter) (steps S303, S307, S311, S315, and S319).

When a toy photo is set, the specific image processing unit 109b performs a shading addition process on image data (step S305). In this step, the specific image processing unit 109b generates a gain map (the gain value of 1 or less) in which the brightness is gradually reduced depending on the distance from the center, and multiplies the image data by a gain depending on each pixel according to the gain map, thereby adding the shading to the periphery.

When a fantastic focus is set, the specific image processing unit 109b performs a soft focus process on the image data (step S309). In this step, the specific image processing unit 109b generates the image data with the airbrushing process performed on the entire image, and combines the image data of the image before the airbrushing process with the image data of the image after the shading process at a specified rate (for example, 3:2 etc.).

When a rough monochrome is set, the specific image processing unit 109b performs a noise superposing process on the image data (step S313). In this step, the noise pattern generated in advance by the specific image processing unit 109b is added to the image data. The noise pattern may be generated based on a random number etc.

When a diorama is set, the specific image processing unit 109b performs the airbrushing process on the image data (step S317). In this step, the specific image processing unit 109b gradually shades the target of the AF from the center of the target to the periphery (for example, vertically, horizontally, or both) depending on the distance.

When a crystal is set, the specific image processing unit 109b performs the cross filter process on the image data (step S321). In this step, the specific image processing unit 109b detects the bright point in the image, and processes the image data so that a cross pattern may be drawn with the bright point set as the center.

When the above-mentioned specific image processing is completed, the combined image processing unit 109c judges whether or not the shooting mode is the combined image mode (step S103 in FIG. 3). If the shooting mode is not the combined image mode, the image processing terminates.

When the shooting mode is the combined image mode, the combined image processing unit 109c performs the combined image generating process using the image data of a plurality of images displayed in a plurality of display areas of the display panel 135 (step S400 in FIG. 3).

Figure 6:
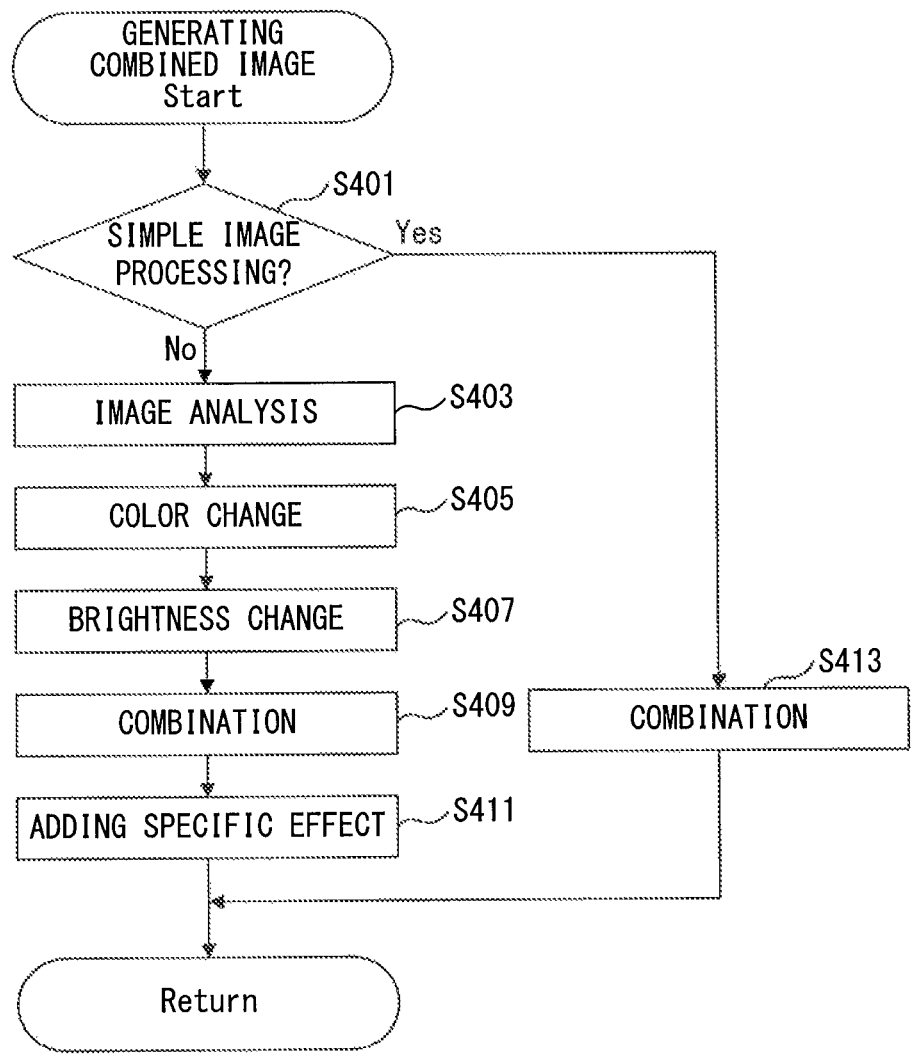
FIG. 6 is a flowchart of the combined image generating process of the camera according to the embodiment 1 of the present invention.

The combined image generating process performed by the combined image processing unit 109c is configured mainly by five image processing steps as illustrated in FIG. 6. First, it is judged whether or not the simple image processing is set (step S401). In this step, the combined image processing unit 109c judges by the state of the simple process setting stored in the SDRAM 127.

When the simple process setting is OFF, the combined image processing unit 109c analyzes an image (step S403). In this step, the combined image processing unit 109c calculates the color distribution and the brightness distribution of each piece of image data of a plurality of images displayed in the display areas of the display panel 135. The color distribution and the brightness distribution may be calculated not from the image data itself (that is, the image data processed by the basic image processing unit 109a and the specific image processing unit 109b) of the image displayed in the display areas, but from the RAW data before the image processing.

After the image analysis, the combined image processing unit 109c performs the color change process so that the images of plural pieces of image data configuring a combined image may present substantially an identical color (step S405). In this step, the combined image processing unit 109c offsets and corrects the color difference Cb and the color difference Cr of each piece of image data so that peak of the color difference Cb and the color difference Cr of plural pieces of image data may present the average value of these color difference. For example, if the color distribution (distribution of color difference) as illustrated in FIGS. 16A and 16D is calculated by the image analysis, the distribution of the color difference Cb and the color difference Cr is offset as illustrated in FIGS. 16B and 16E. As a result, as illustrated in FIGS. 16C and 16F, the plurality of images after the color change process present substantially an identical color. Other methods of changing a color in the color change process may be, for example, multiplying R and B by a gain in an RGB color space in addition to the method of changing the color difference Cb and the color difference Cr.

Furthermore, after the color change process, the combined image processing unit 109c performs the brightness change process so that the brightness of the image of plural pieces of image data configuring a combined image presents an identical brightness (step S407). In this step, the combined image processing unit 109c corrects each piece of image data so that the average value of each of the brightness distribution of plural pieces of image data may present the average brightness distribution of the plural pieces of image data. For example, if the distribution of the brightness Y as illustrated in FIG. 17A is acquired by the image analysis, the combined image processing unit 109c corrects the distribution of the brightness Y by performing the gamma conversion different for the RGB data of each piece of image data as illustrated in FIG. 17B, and obtains a substantially identical brightness for a plurality of images as illustrated in FIG. 17C. The reason for correcting the brightness not by the gamma conversion on the brightness component, but by the gamma conversion in the RGB color space is to avoid unnatural color of an image although the brightness is greatly changed by the correction. In addition to the method using the above-mentioned gamma change, the method of changing the brightness in the brightness change process may be, for example, other methods such as changing the brightness only in a dark area such as in the shade etc., changing the brightness only in a bright area, etc.

After the brightness change process, the combined image processing unit 109c performs the combining process which combines plural pieces of image data whose color and brightness have been corrected (step S409). In this step, the combined image processing unit 109c combines the image data of a plurality of images displayed on the plurality of display areas of the display panel 135, that is, the plural pieces of image data on which the color change process and the brightness change process have been performed, and generates the image data of a combined image laid out so that a plurality of images are displayed on the display panel 135. Finally, the specific image processing unit 109b applies the specific effect such as the airbrushing process, the shading application, etc. which are applicable using an art filter etc. depending on the style of combined image without setting a finishing process by a camera setting (step S411), thereby terminating the combined image generating process.

On the other hand, when the simple process setting is ON, the combined image processing unit 109c combines the image data of a plurality of images displayed in the plurality of display areas of the display panel 135, and generates the image data of a combined image laid out so that the plurality of images are displayed on the display panel 135 (step S413). Afterwards, the combined image generating process is terminated. Thus, the image processing in FIG. 3 terminates.

According to the camera 1 which generates a combined image by the operations above, each of the plurality of frame images is corrected based on the result of the comparison with other frame images. Then, the camera 1 generates the image data of a combined image by combining image data of corrected frame images. Therefore, as compared with the conventional camera which performs the image processing on each frame image independently, a better image as a combined image may be obtained as well balanced in color tone and brightness. Although FIG. 6 exemplifies the color change process and the brightness change process performed on each frame image, the image processing performed based on the result of the comparison with other frame images is not limited to this example, but other image processing may be performed.

Figure 7:
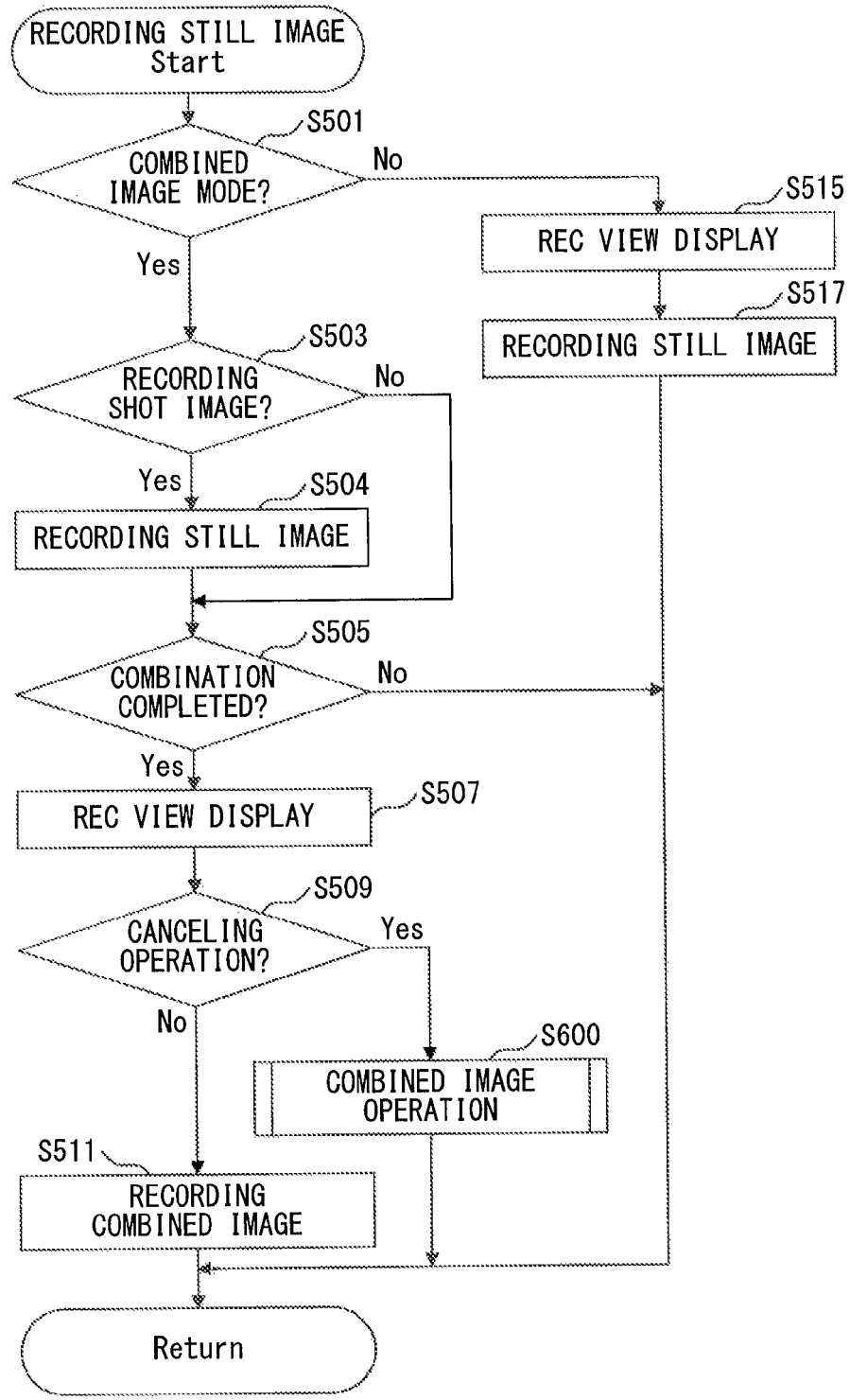
FIG. 7 is a flowchart of the still image recording process of the camera according to the embodiment 1 of the present invention.

Next, the still image recording performed after the image processing on the image data acquired by shooting an image using a mechanical shutter illustrated in FIGS. 2A and 2B is described further in detail with reference to FIG. 7.

As illustrated in FIG. 7, when the still image recording process is started, the microcomputer 121 first judges whether or not the shooting mode is the combined image mode (step S501). In this step, the judgment is made by setting the shooting mode stored in the SDRAM 127.

When the shooting mode is not the combined image mode, the microcomputer 121 controls the display driver 133, and REC-view displays one image of the image data image shot with a mechanical shutter and processed by the image processing unit 109 on the display panel 135 (step S515). Then, the microcomputer 121 controls the memory I/F 129, and records the image data of the displayed images in the recording medium 131 (step S517), thereby terminating the still image recording process. The image data may be recorded after compressed in the JPEG format by the image compressing/decompressing unit 117, and may also be recorded as uncompressed. Furthermore, the microcomputer 121 may record with the image data the RAW data before the image processing unit 109 performs the image processing on the data.

On the other hand, when the shooting mode is the combined image mode, the microcomputer 121 judges whether or not a setting is made to record a frame image shot to configure a combined image (also referred to as a shot image) (step S503). When the setting is made to record the image, the microcomputer 121 controls the memory I/F 129 and records the frame image processed by the image processing unit 109 in the recording medium 131 (step S504).

Afterwards, the microcomputer 121 judges whether or not the combination is completed, that is, whether or not all frame images which configure the combined image have been shot (step S505). When the image which is to be incorporated into the combined image and is acquired in advance is set, the microcomputer 121 judges whether or not all frame images excluding the image which has been acquired in advance have been shot. In this step, the judgment is made depending on whether or not the frame images of the number determined depending on the style of the set combined image have been stored in the frame image area of the SDRAM 127. If all frame images have not been shot, the still image recording process is terminated.

If all frame images have been shot, the microcomputer 121 controls the display driver 133, and REC-view displays the combined image generated by the image processing unit 109 on the display panel 135 (step S507).

Then, the microcomputer 121 monitors a canceling operation for a specified period (for example, 3 seconds) (step S509) to allow the user to have the time to judge whether or not the combined image which is REC-view displayed is a desired image.

When the canceling operation is detected in the specified period, the microcomputer 121 performs the combined image operating process to cancel the specified image (step S600), thereby terminating the still image recording process.

If no canceling operation is detected, the microcomputer 121 controls the memory I/F 129, and records the image data of the combined image generated by the image processing unit 109 in the recording medium 131 (step S511), thereby terminating the still image recording process. Instead of monitoring the canceling operation for a specified period, the microcomputer 121 may display the screen to inquire whether or not the recording operation is to be performed (whether or not the canceling operation is performed), and cancel or record an image depending on the user input.

Figure 8A:
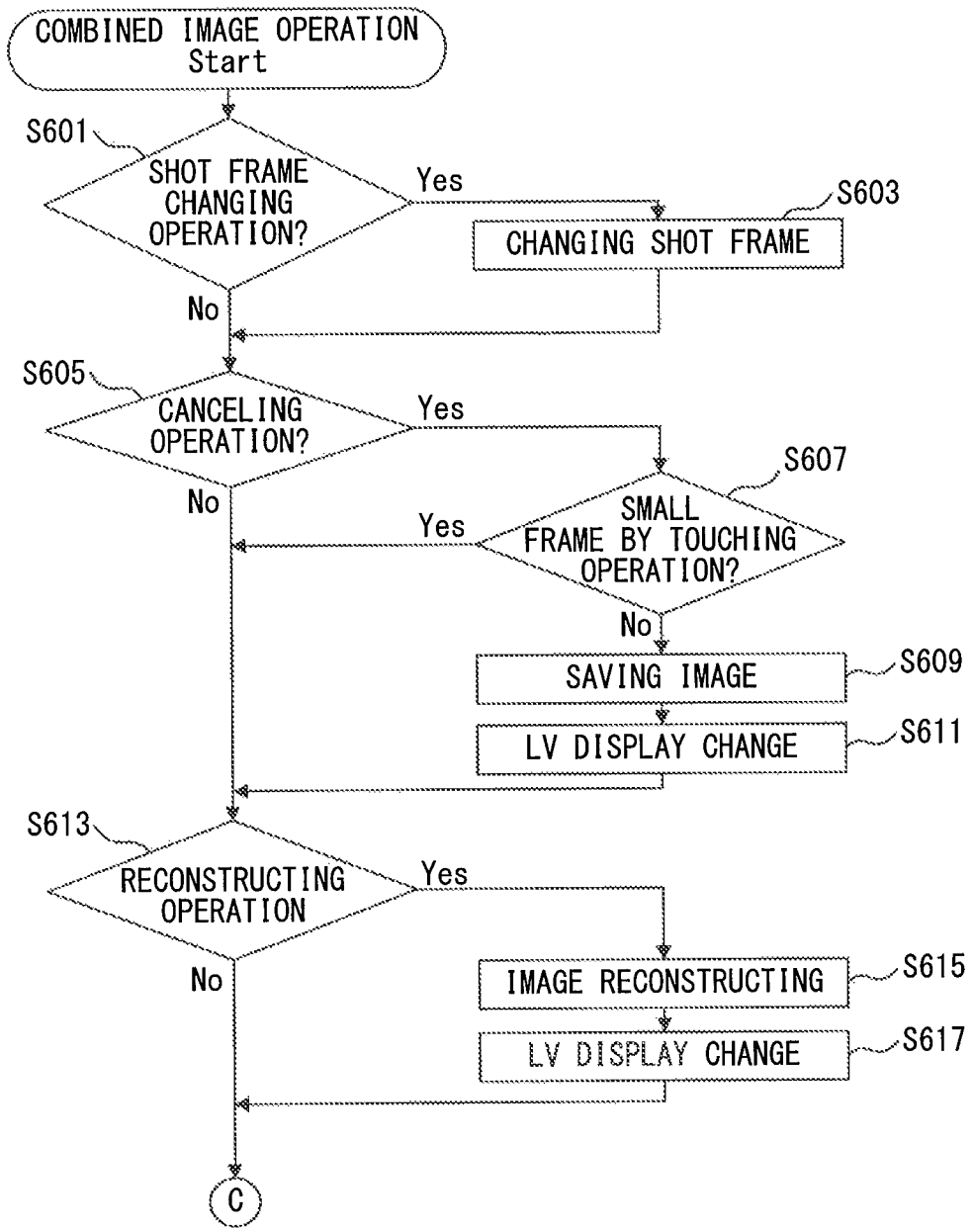
FIGS. 8A and 8B are flowcharts of the combined image operating process of the camera according to the embodiment 1 of the present invention.
Figure 8B:
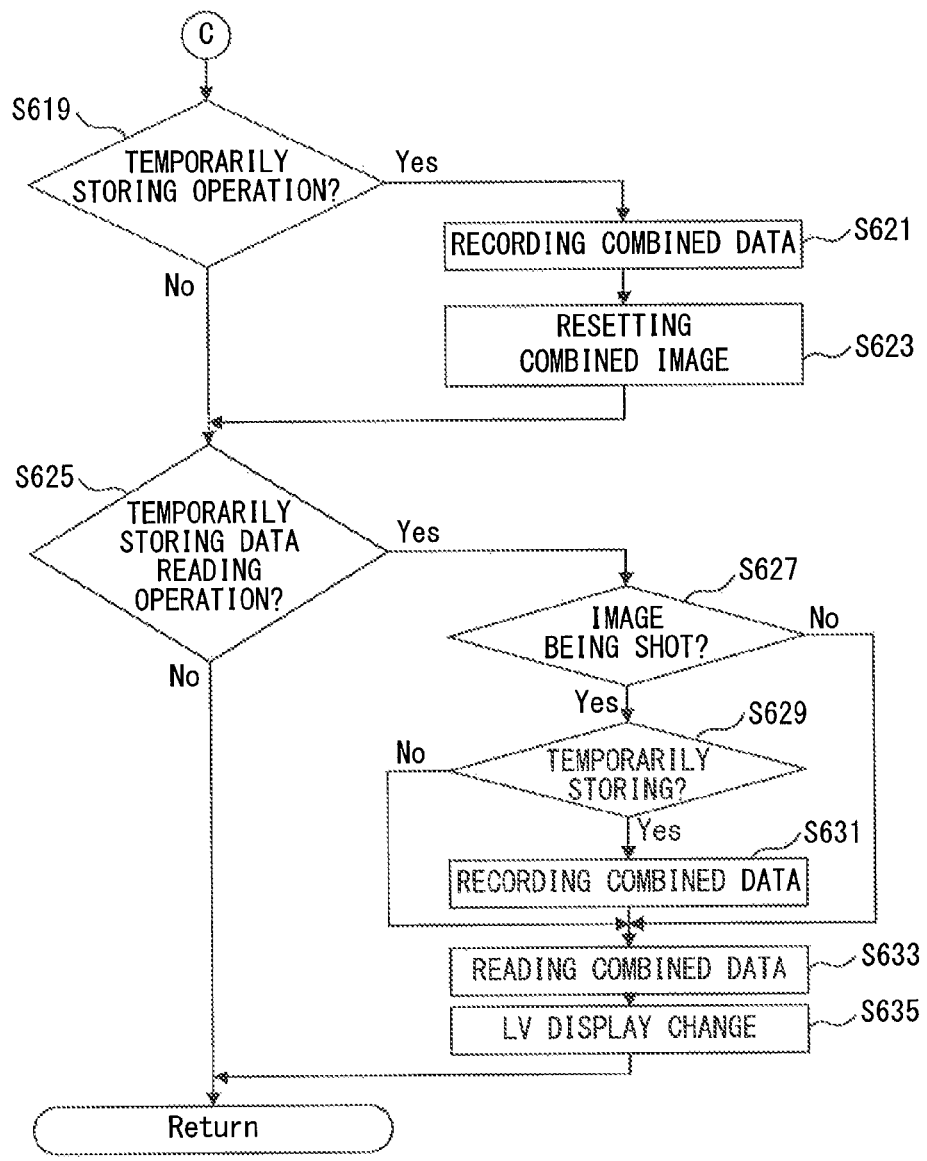

The combined image operating process is described below further in detail with reference to FIGS. 8A and 8B.

As illustrated in FIGS. 8 A and 8B, when the combined image operating process is started, the operation which has started the combined image operating process is specified. Concretely, the microcomputer 121 sequentially judges whether or not the shot frame changing operation, the canceling operation, the reconstructing operation, the temporarily storing operation, the temporarily storing data reading operation have been performed (steps S601, S605, S613, S619, and S625).

The judgment as to whether or not the shot frame changing operation in step S601 has been performed is made depending on whether or not the touch input unit 124 has detected the touching operation on the display area on which no image is displayed. When the microcomputer 121 detects the touching operation on the display area on which no image is displayed, it performs the shot frame changing process, that is, the process of displaying a live view image in the display area touched by switching the display area on which a live view image is to be displayed is performed as exemplified in FIGS. 18A and 18B (step S603).

The judgment as to whether or not the canceling operation in step S605 has been performed is made depending on whether or not the touch input unit 124 has detected the touching operation performed on the display area in which the image (frame image) based on the RAW data obtained by shooting a still image using a mechanical shutter is displayed. When the touching operation on the display area in which the frame image is displayed is detected, the microcomputer 121 judges whether or not the touched frame image (display area) is small (step S607).

If it is judged that the frame image is small, the microcomputer 121 performs the process in step S613 without performing the canceling process (steps S609 and 611) described later. When the frame image is small, for example, a user may unintentionally touch a display area which is not to be touched, that is, a user intends to touch a live view image for a shoot instruction, but may touch a frame image by mistake. Therefore, to avoid an occurrence of an unintentional canceling process, the judging process is performed.

It may be judged whether or not the frame image is small by the number of display areas or the style of a combined image. That is, for example, it may be set so that when the style corresponding to the layout in which there are a large number of divisions (display areas) as illustrated in FIG. 14G is set, it is judged that the frame image is small, and when the styles corresponding to other layouts are set, it is judged that the frame image is large.

It may also be judged by the microcomputer 121 whether or not the frame image is small depending on whether or not the area of the touched display area is smaller than a specified area. In this case, unlike the case in which a judgment is made by the number of display areas or the style of a combined image, the size of the display panel 135 is considered. Therefore, it is preferable that the canceling process may be avoided only when the size of a frame image may cause an unintentional canceling process.

Figure 19:
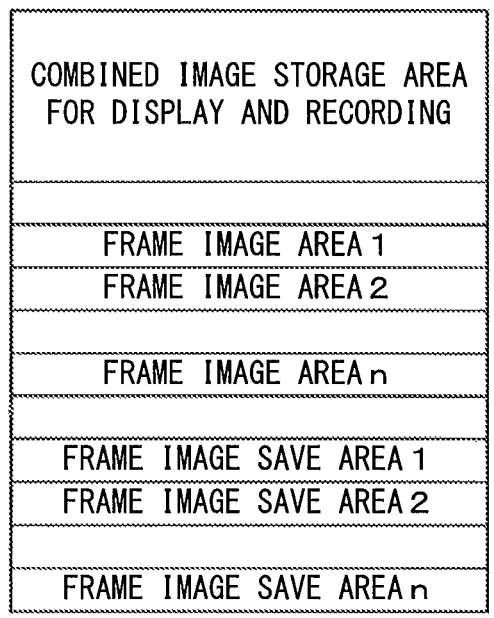
FIG. 19 is an explanatory view of the configuration of a displaying/recording combined image storage area of SDRAM of the camera according to the embodiment 1 of the present invention.
Figure 21C:
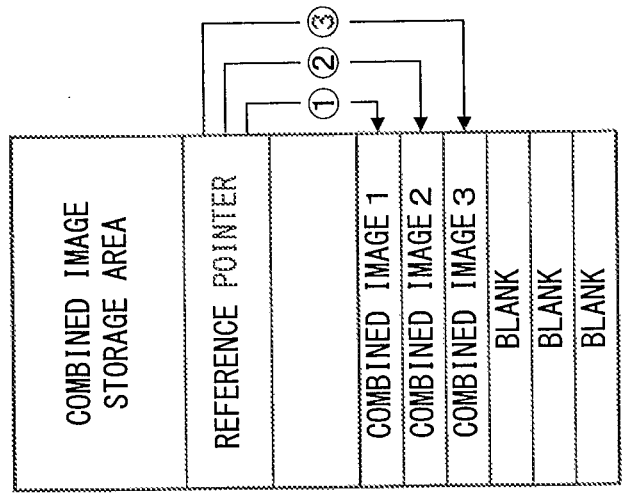
FIGS. 21A through 21C are other explanatory views of saving frame image data by a canceling operation and reconstructing frame image data by a reconstructing operation of the camera according to the embodiment 1 of the present invention.
Figure 21B:
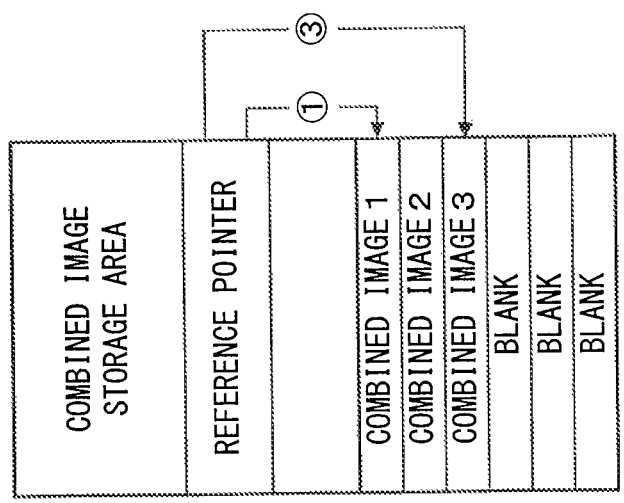
Figure 21A:
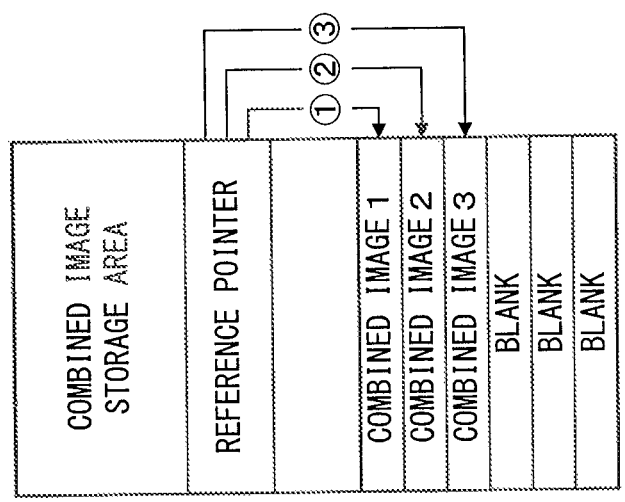

If it is judged that a frame image is large, the microcomputer 121 performs the avoiding process of saving image data of a frame image displayed in the touched display area (step S609). Concretely, as illustrated in FIG. 19, when the SDRAM 127 secures a combined image storage area for display and storage which is configured by a frame image area and a frame image save area, for example, the microcomputer 121 copies the image data of the frame image displayed in the touched display area from the frame image area in the SDRAM 127 to the frame image save area as illustrated in FIGS. 20A and 20B, and the source image data stored in the frame image area is deleted. As illustrated in FIGS. 21A and 21B, if the image data of a frame image is managed using a reference pointer, the microcomputer 121 may delete the reference by the reference pointer to the address of the image data instead of deleting the image data itself.

Afterwards, the microcomputer 121 performs the live view display change process as exemplified in FIGS. 22A and 22B, that is, the process of changing the image displayed in the touched display area by switching the display area in which a live view image is to be displayed into the live view image (step S611).

The judgment as to whether or not the reconstructing operation in step S613 has been performed is made depending on whether or not the operation unit 123 has detected a specified operation (for example, a double clicking operation on the display area in which a live view image is displayed, a pressing operation of a deletion button performed while selecting a display area in which a live view image is displayed, etc.). When the reconstructing operation is detected, the microcomputer 121 performs the image reconstructing process (step S615) of reconstructing image data of a frame image canceled by the canceling operation (steps S609 and S611). Concretely, as illustrated in FIGS. 20B and 20C, for example, the microcomputer 121 copies the image data of the frame image saved in the save area of the SDRAM 127 to the source frame image area, thereby performing the process of deleting the image data of the frame image save area. Otherwise, as illustrated in FIGS. 21B and 21C, if the image data of a frame image is managed using a reference pointer, the microcomputer 121 may reconstruct the reference by a reference pointer to the address of the image data.

Then, the microcomputer 121 performs the live view display change process, that is, the process of displaying a reconstructed frame image in a display area in which a live view image is displayed, and displaying a live view image in an area in which a frame image is not displayed (step S617).

The judgment as to whether or not the temporarily storing operation in step S619 has been performed is made depending on whether or not the operation unit 123 has detected a specified operation (for example, a pressing operation of a temporarily storing button). Upon detection of the temporarily storing operation, the microcomputer 121 controls the memory I/F 129, and stores the image data of the frame image stored in the combined image storage area of the SDRAM 127 and other data (for example, the data relating to the style of a set combined image, the data indicating the relationship between the image data of the frame image and the display area, etc.) for generation of the image data of a combined image in the recording medium 131 (step S621). The data may be stored in the flash memory 125 instead of the recording medium 131. Afterwards, the microcomputer 121 performs a combined image reset process of deleting the image data stored in the combined image storage area of the SDRAM 127 and updating the display state of the display panel 135 (step S623).

The judgment as to whether or not the temporarily storing data reading operation in step S625 has been performed is made depending on whether or not the operation unit 123 has detected a specified operation (for example, pressing a temporarily storing data reading button etc.) When the temporarily storing data reading operation is detected, the microcomputer 121 judges whether or not a shooting operation is being performed (step S627). It is judged depending on, for example, whether or not the image data of the frame image is stored in the combined image storage area of the SDRAM 127.

If it is judged that the shooting operation is being performed, the microcomputer 121 controls the display driver 133, and performs display on the display panel 135 for selection as to whether or not the image data of a frame image stored in the combined image storage area is temporarily stored (step S629). If the user selects the temporary storage, the microcomputer 121 controls the memory I/F 129, and stores the image data etc. of a frame image stored in the combined image storage area in the recording medium 131 (step S631). The data may be stored in the flash memory 125 instead of the recording medium 131.

Then, the microcomputer 121 reads the image data etc. of a frame image stored in step S621 from the recording medium 131, and lays out the data in the combined image storage area of the SDRAM 127 (step S633). The microcomputer 121 displays the image data of the frame image stored in the combined image storage area of the SDRAM 127 in the display area of the display panel 135, and further displays a live view image in the display area in which the frame image is not displayed (step S635). As described above, the combined image operating process in FIGS. 8A and 8B terminates.

Figure 23A:
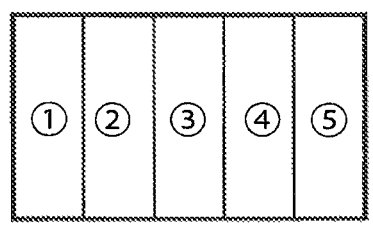
FIGS. 23A through 23C illustrate the relationship between the display area and the shooting order of the camera according to the embodiment 1 of the present invention.
Figure 23B:
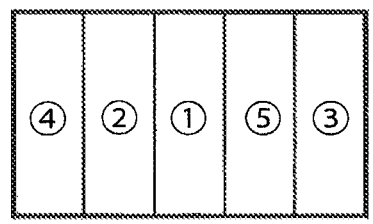
Figure 23C:
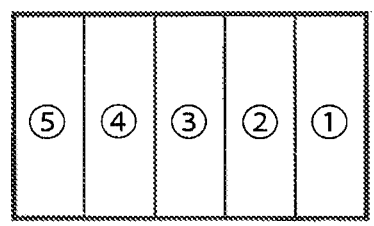
Figure 24:
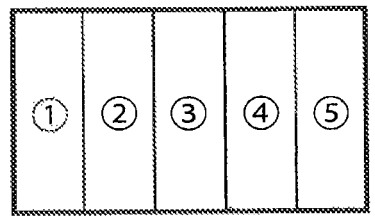
FIG. 24 illustrates the relationship between the display area and the shooting order of a conventional camera.

Using the camera 1 which operates as described above, as illustrated in FIGS. 18A and 18B, the display area in which a live view image is displayed may be easily changed by a touching operation. Therefore, for example, as illustrated in FIGS. 23A through 23C, frame images shot in an arbitrary order may be displayed in each of a plurality of display areas. Accordingly, unlike the conventional camera for which the display area is defined about the shooting order as illustrated in FIG. 24, a combined image may be generated with the frame images which have been shot in an intended order displayed in an intended area. Therefore, the camera 1 may easily generate the image data of a desired combined image.

FIGS. 18A and 18B exemplify changing the display area in which a live view image is displayed by a touching operation on the display panel 135, but the camera 1 may change the display area in which a live view image is displayed by a key operation of a cross key etc. Furthermore, for example, as illustrated in FIGS. 15A through 15E, when a live view image is set in all display areas excluding the display area in which a frame image is displayed, a display area for a shooting frame (that is, a display area in which a frame image is displayed in the next shooting operation) may be changed by a cross key. Thus, although a shooting operation is specified by a release button, as in the case in which a shooting operation is specified by a touching operation, a combined image may be generated with the frame images which have been shot in an intended order displayed in an intended area.

Furthermore, as illustrated in FIGS. 22A and 22B, the camera 1 cancels a frame image and changes it into a live view image only by touching the display area in which the frame image is displayed. Therefore, the user may easily shoot an image again by a simple operation when a frame image is not a desired image, and therefore easily generates the image data of a desired combined image.

FIGS. 22A and 22B exemplify display of a live view image in a display area touched for cancellation of a frame image, but the camera 1 may display a background image in the touched display area. In this case, the user may cancel a frame image without changing the display area in which a live view image is to be displayed.

Figure 27A:
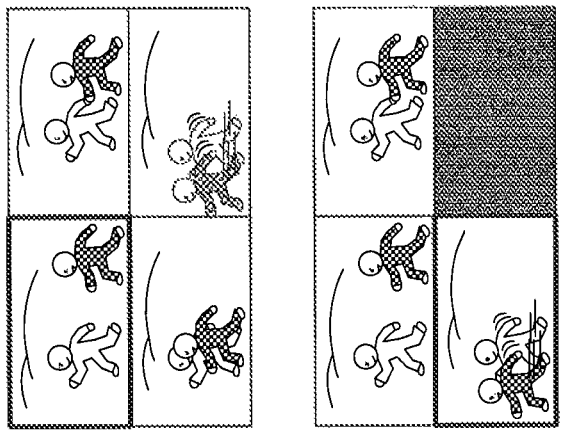
FIGS. 27A through 27C are further explanatory views of the canceling operation of the camera according to the embodiment 1 of the present invention.
Figure 27B:
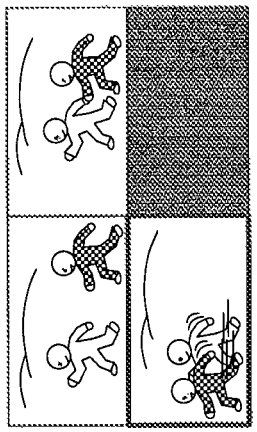
Figure 27C:
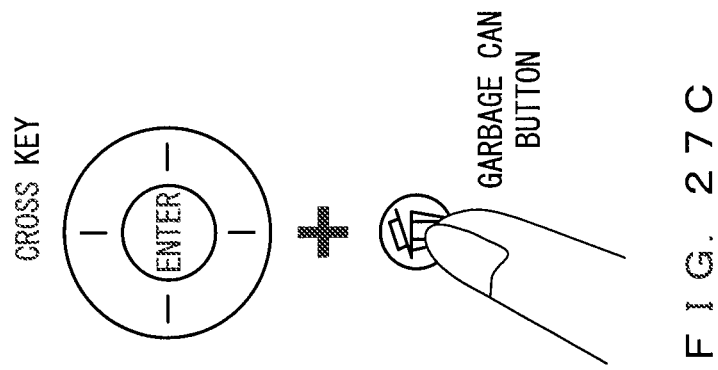

In addition, the method of canceling a frame image is not limited to the method illustrated in FIGS. 22A and 22B. For example, as illustrated in FIGS. 25A and 25B, the camera 1 may cancel a frame image by a touching operation on the garbage can mark displayed in each display area. Furthermore, as illustrated in FIGS. 26A and 26B, only one garbage can mark may be displayed at the end of the display panel 135. In this case, the camera 1 may cancel the frame image by the operation of dragging the frame image to be canceled to the garbage can mark. In addition, as illustrated in FIGS. 27A through 27C, the camera 1 may cancel the frame image selected by the cross key through the operation on the cross key and the garbage can button instead of the operation on the display panel 135.

Figure 9:
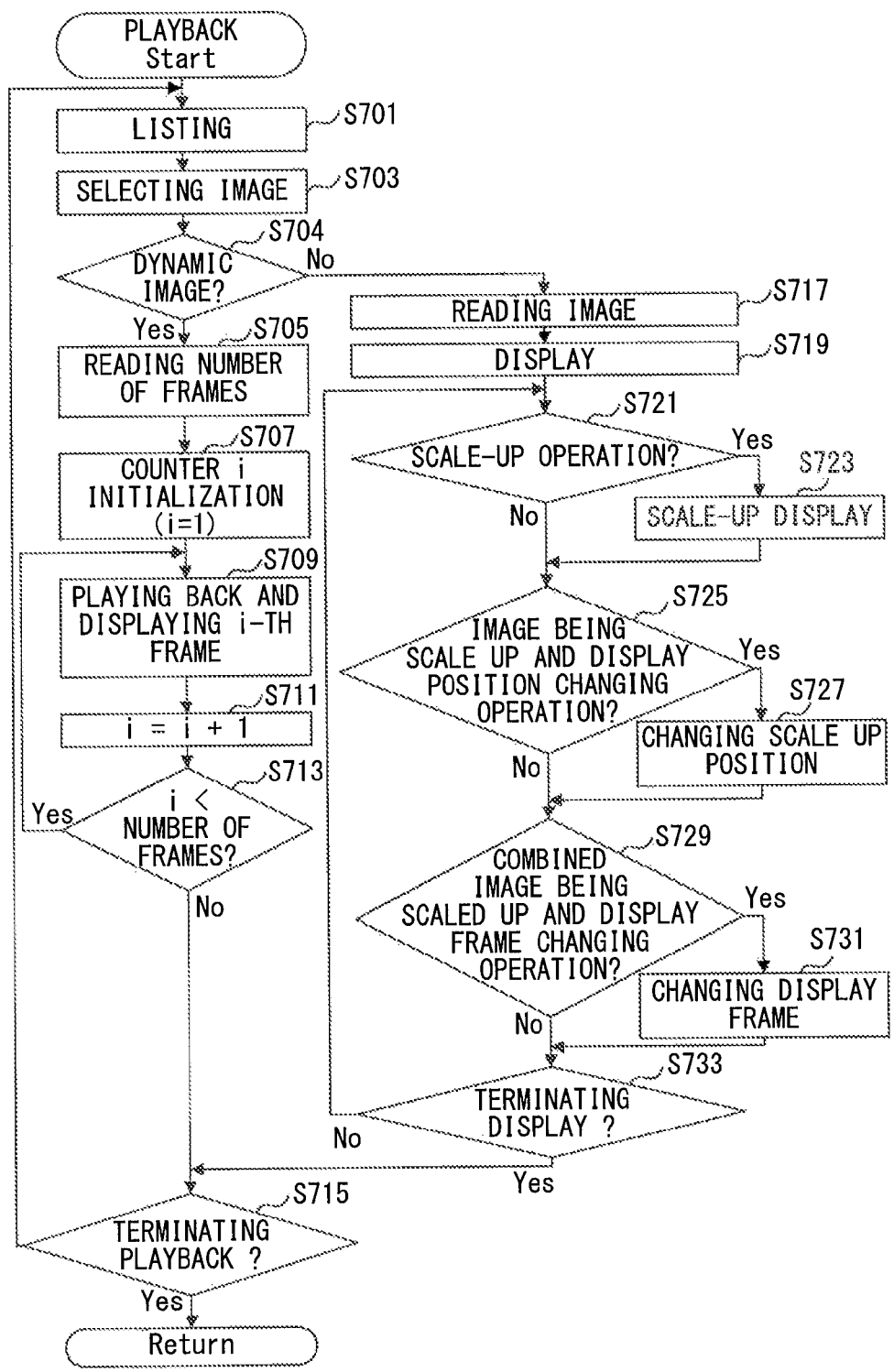
FIG. 9 is a flowchart of the replay process of the camera according to the embodiment 1 of the present invention.
Figure 11A:
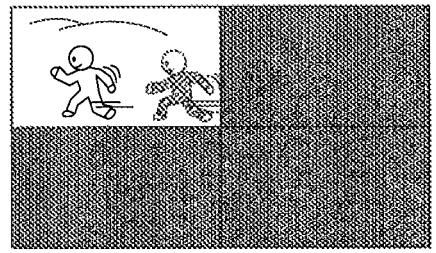
FIGS. 11A through 11E are explanatory views of the shooting operation of the camera according to the embodiment 1 of the present invention.
Figure 11B:
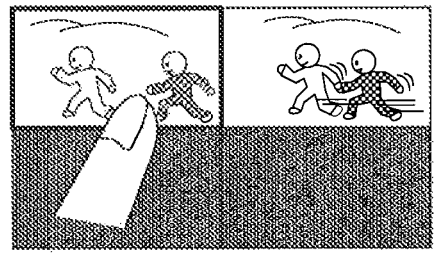
Figure 11C:
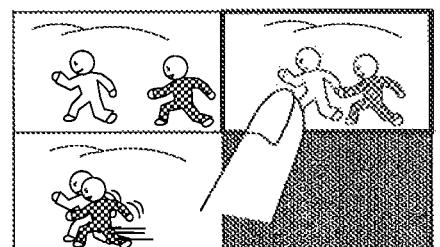
Figure 11D:
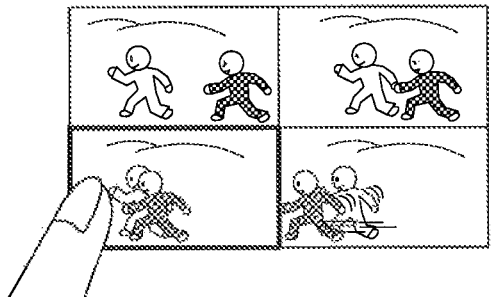
Figure 11E:
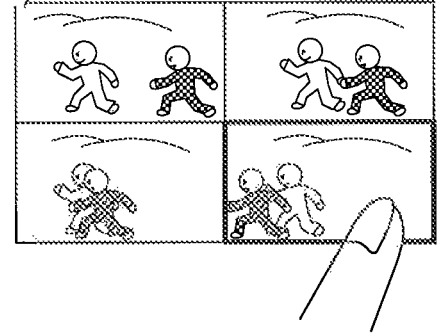
Figure 13A:
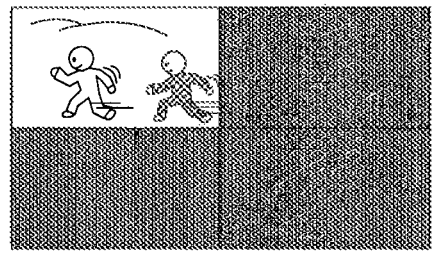
FIGS. 13A through 13E are further explanatory views of the shooting operation of the camera according to the embodiment 1 of the present invention.
Figure 13B:
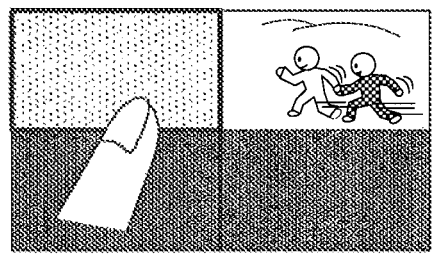
Figure 13C:
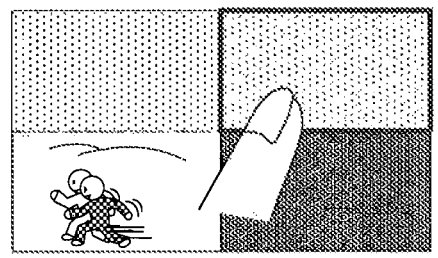
Figure 13D:
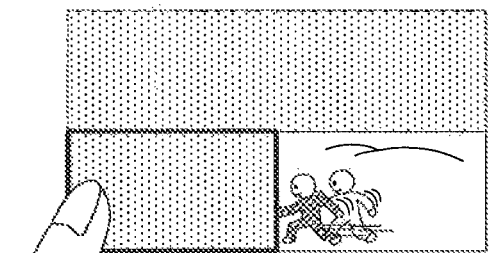
Figure 13E:
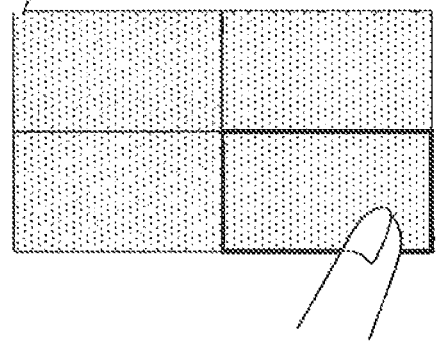

Next, with reference to FIG. 9, the playback process illustrated in FIG. 2A is described in more detail.

As illustrated in FIG. 9, when the playback process is started, the microcomputer 121 controls the memory I/F 129 to read image data from the recording medium 131, controls the display driver 133 to list on the display panel 135 the thumbnails of the image (still images and dynamic images) stored in the recording medium 131 (step S701), and monitors the image selecting operation by a user (step S703). Upon detection of image selection, it is judged whether the selected image is a dynamic image (step S705).

If the image is a dynamic image, the microcomputer 121 reads the number of frames from the header of the dynamic image file (step S707), and sequentially plays back the frame image in the dynamic image file after the initialization of the counter i (step S707), and displays the images on the display panel 135 (steps S709, S711, and S713).

On the other hand, when the image is a still image, the microcomputer 121 reads the image data of the selected image (step S717), and the selected image is displayed on the display panel 135 (step S719). Afterwards, each operation performed by a user during image playback is monitored (steps S721, S725, S729, and S733).

When the scale-up operation is detected by pressing a scale-up button (step S721), the microcomputer 121 performs the scale-up display process of scaling up and displaying the image displayed on the display panel 135 (step S723).

Figure 28A:
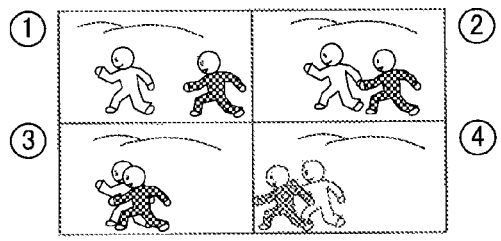
FIGS. 28A through 28G are explanatory views of a scale-up display operation in a playback mode of the camera according to the embodiment 1 of the present invention.
Figure 28B:
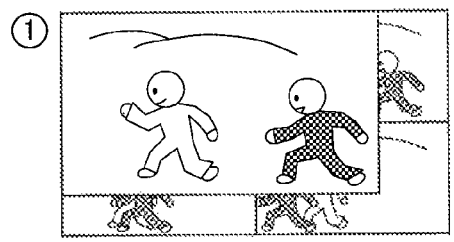
Figure 28E:
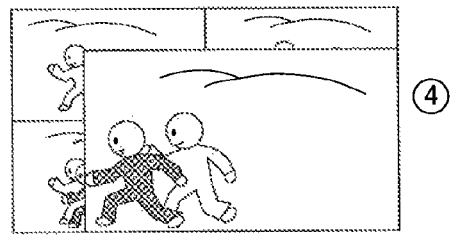
Figure 28C:
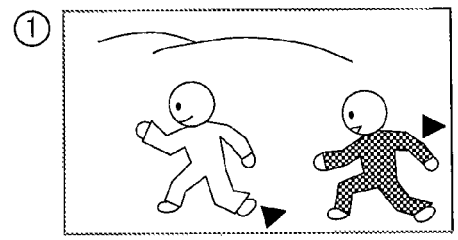
Figure 28F:
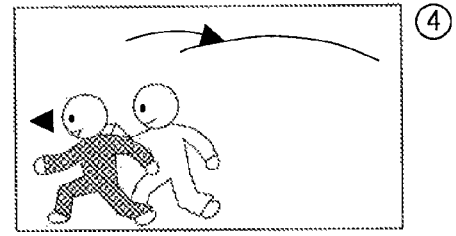
Figure 28D:
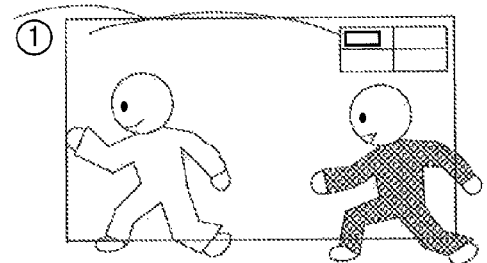
Figure 28G:
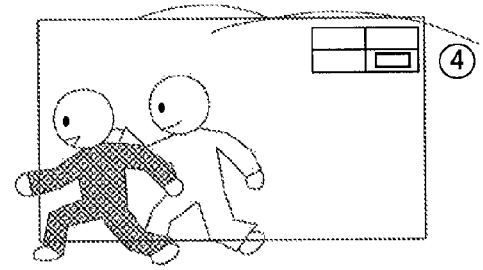
Figure 29A:
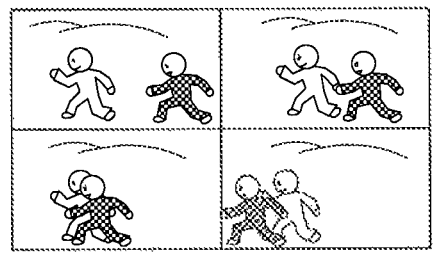
FIGS. 29A and 29B are other explanatory views of a scale-up display operation in a playback mode of the camera according to the embodiment 1 of the present invention.
Figure 29B:
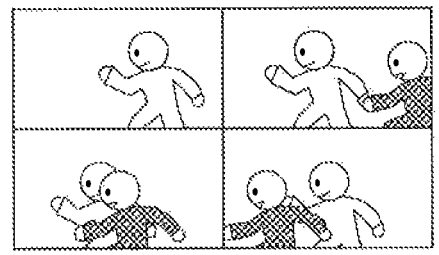

As illustrated in FIG. 28A, when the displayed image is a combined image, the microcomputer 121 enlarges the display area in which a specific frame image that configures a combined image is displayed, thereby scaling up and displaying the specific frame image as illustrated in FIG. 28B or 28E. As illustrated in FIGS. 28C and 28F, the microcomputer 121 may display the specific scaled-up frame image on the entire display panel 135. In this case, an arrow mark is applied to the scaled up frame image so that the presence of other frame images configuring the combined image may be emphasized. As illustrated in FIGS. 28D and 28G, the microcomputer 121 may scale up the frame image exceeding the size of the display panel 135. In this case, the range of the frame image which occupies in the combined image displayed on the display panel 135 may be displayed with the frame image. In addition, instead of scaling up and displaying a specific frame image, the microcomputer 121 may scale up and display all frame images which configure the combined image as illustrated in FIGS. 29A and 29B.

When the operation of changing the display position using a cross key etc. is detected during the scale-up display (step S725), the microcomputer 121 performs a scale up position change process (step S727).

For example, when a normal image, not a combined image, is displayed, the microcomputer 121 changes the part which is scale-up displayed in the image. Furthermore, if a specific frame image which configures a combined image as illustrated in FIGS. 28D and 28G is scale-up displayed exceeding the size of the display panel 135, the microcomputer 121 changes the part scale-up displayed in the specific frame image.

When the operation of changing the frame image to be displayed using a specified button such as an FN button etc. is detected during the scale-up display of a combined image (step S729), the microcomputer 121 performs the display frame change process of switching frame images to be scale-up displayed (step S731). Before switch frame images, the scale-up display state of the frame image currently being displayed is stored. Thus, when the frame image currently being displayed is displayed again, the camera 1 may scale-up display a frame image in the identical scale-up display state, that is, the state in which the parts are scale-up displayed in the frame image is identical. Afterwards the microcomputer 121 repeats monitoring each operation until the end of display of a still image is specified (step S733).

When the end of display of a still image is specified, the microcomputer 121 judges whether or not the playback process is terminated (step S715). For example, the microcomputer 121 detects the change of the operation mode of the camera 1 from the playback mode to the shooting mode, and makes a judgment. When a change of the operation mode is not detected, the microcomputer 121 performs again the step S701 to list thumbnails. On the other hand, when the change of the operation mode to the shooting mode is detected, the microcomputer 121 terminates the playback process.

Figure 30A:
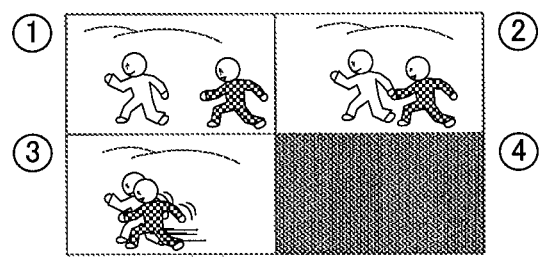
FIGS. 30A through 30C are explanatory views of a scale-up display operation in a combined image mode of the camera according to the embodiment 1 of the present invention.
Figure 30B:
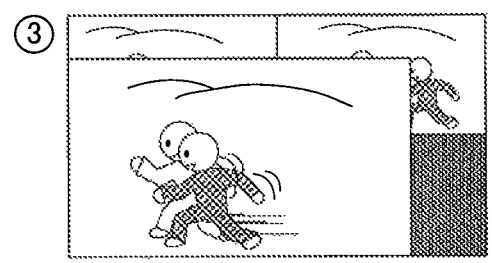
Figure 30C:
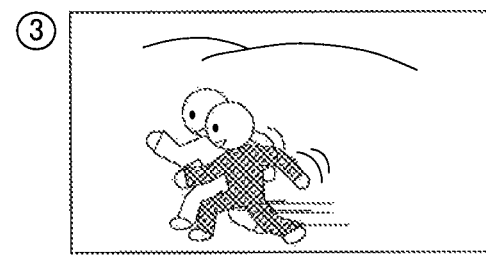

In FIGS. 28A through 28G, and 29A and 29B, the scale-up display during the playback process is described, but the scale-up display may be performed during shooting or REC view display. For example, as illustrated in FIGS. 30A through 30C, when the scale-up operation by a user is detected in the combined image mode, the camera 1 may scale up a live view image. Thus, by scaling up and displaying a live view image, an environment in which a user may easily concentrate in shooting may be provided.

In addition, although scale-up display may be performed for only a still image in FIG. 9, the camera 1 may perform scale-up display, scale-up position change, display frame change, etc. to dynamic images as with still images.

As described above, with the camera 1 according to the present embodiment, when the operation unit 123 receives a shoot instruction by a touch etc. on the display area in which a live view image is displayed, a frame image is acquired, and the display area in which a live view image is displayed is automatically switched. In addition, when the operation unit 123 receives a cancel instruction by a touching operation etc. on the display area in which a frame image is displayed, the frame image is canceled, and a live view image is displayed for a retrial of a shooting operation. Furthermore, with the camera 1 according to the present embodiment, when image data of a combined image is generated, each frame image configuring a combined image is corrected based on a comparison result with other frame images, thereby obtaining a good combined image. Therefore, with the camera 1 according to the present embodiment, image data of a desired combined image may be easily generated in a simple operation. Furthermore, with the camera 1 according to the present embodiment, since the image data of a desired combined image may be easily generated in a simple operation, a user may maintain a high motivation for generating a combined image.

Embodiment 2

Figure 31A:
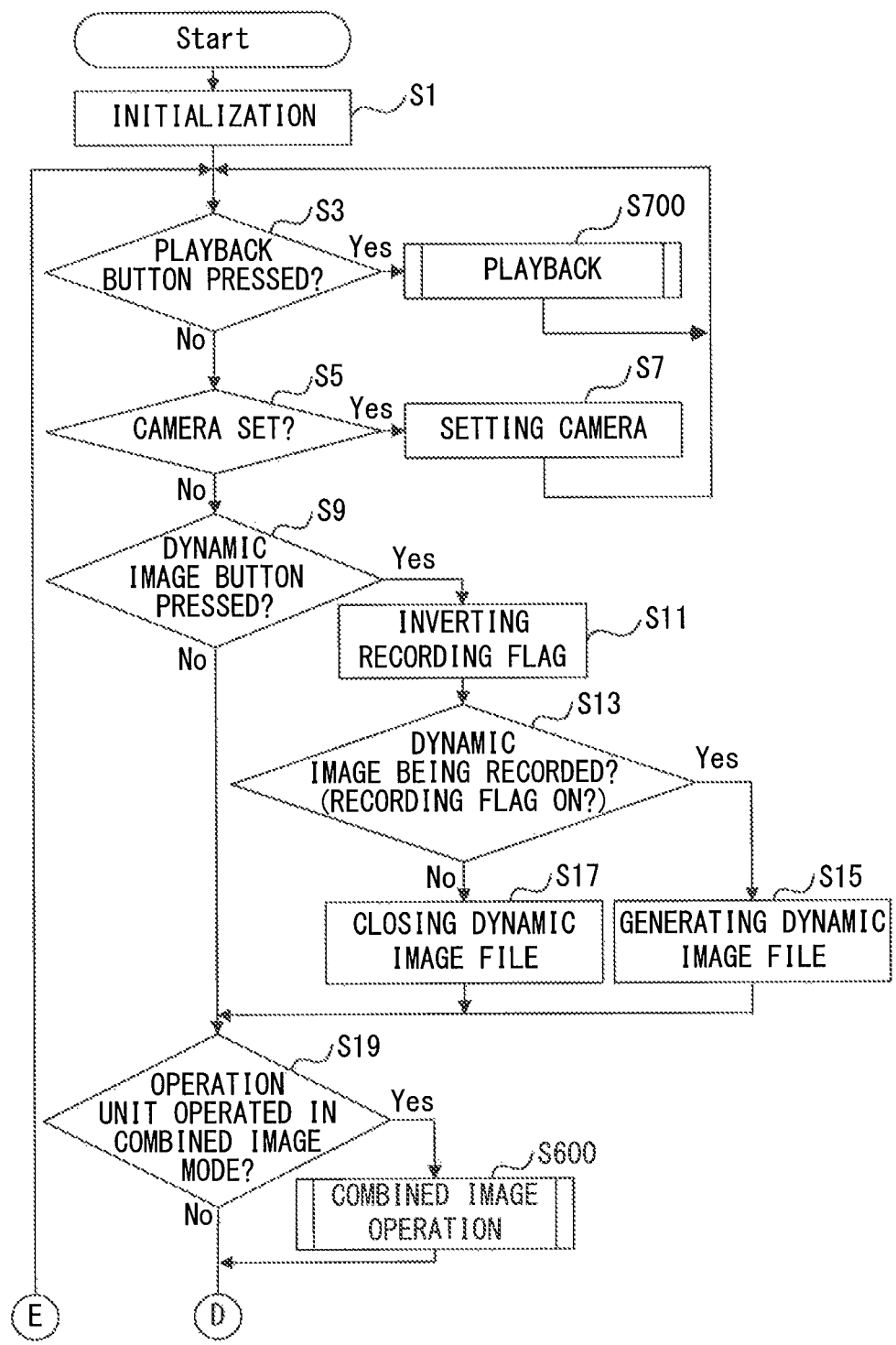
FIGS. 31A and 31B are flowcharts of the entire process of the camera according to the embodiment 2 of the present invention.
Figure 31B:
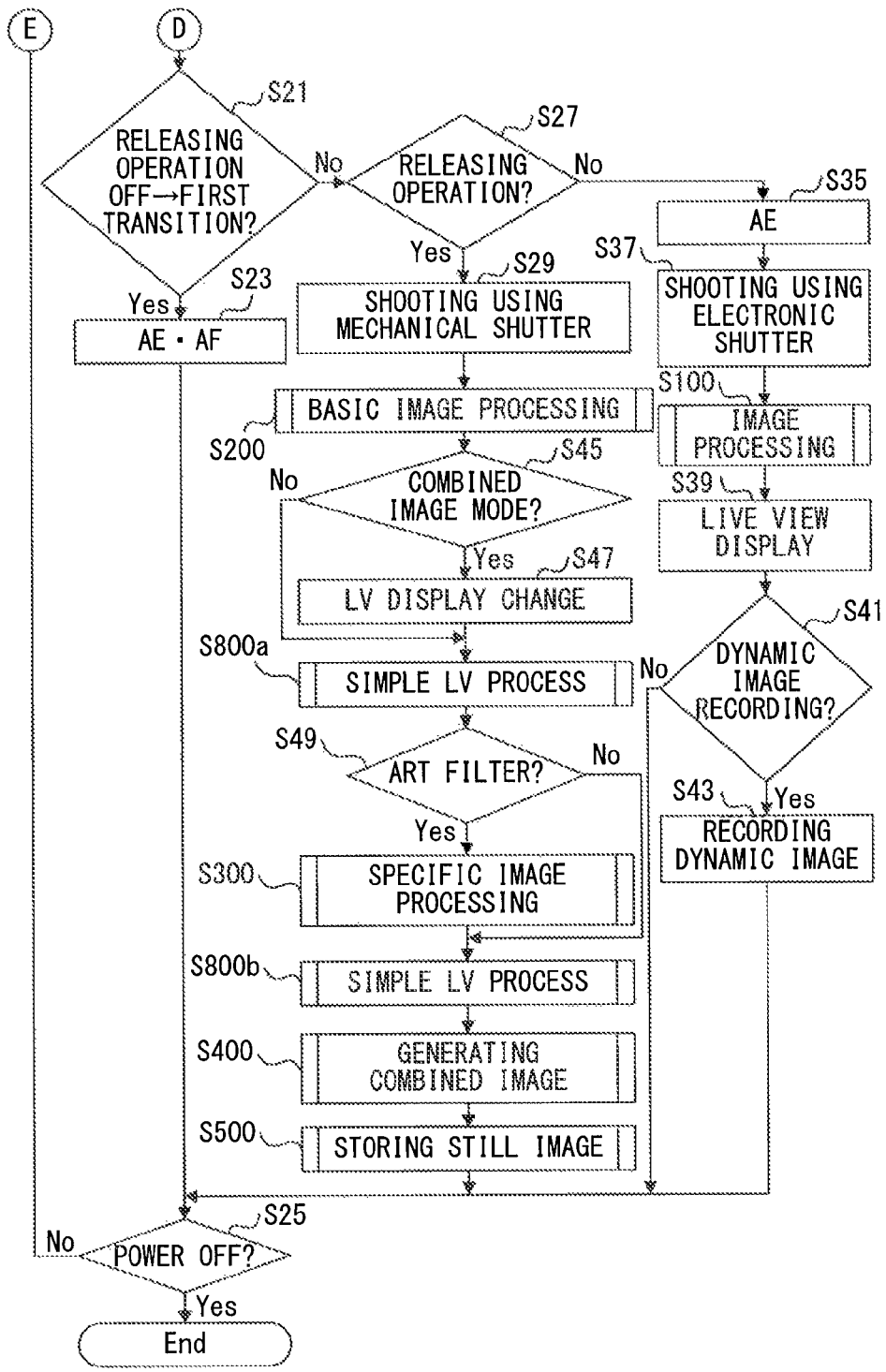
Figure 32:
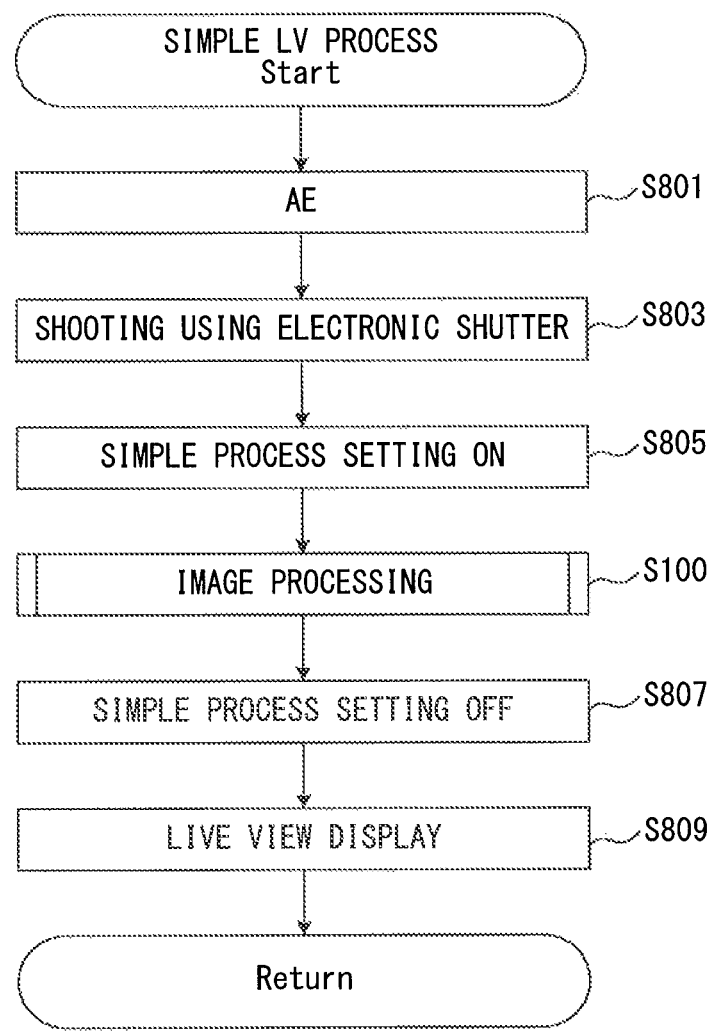
FIG. 32 is a flowchart of the simple LV process of the camera according to the embodiment 2 of the present invention.

FIGS. 31A and 31B are flowcharts of the entire process of the camera according to the present embodiment. FIG. 32 is a flowchart of the simple LV process of the camera according to the present embodiment. FIGS. 33A through 33D are explanatory views of a shooting operation of the camera according to the present embodiment. FIG. 34 is a timing chart of the process in each unit of the camera according to the present embodiment.

The process performed by the camera according to the present embodiment is described below mainly about the difference from the process performed by the camera 1 according to the embodiment 1 with reference to FIGS. 31A through 34. Furthermore, the camera according to the present embodiment has a physical configuration similar to that of the camera 1 according to the embodiment 1 illustrated in FIG. 1.

The process of the camera illustrated in FIGS. 31A and 31B is different from the process of the camera 1 according to the embodiment 1 illustrated in FIGS. 2A and 2B that the process performed when the 2nd releasing operation (for example, the release button is fully pressed) is detected.

Figure 33A:
FIGS. 33A through 33D are explanatory views of the shooting operation of the camera according to the embodiment 2 of the present invention.
Figure 34:
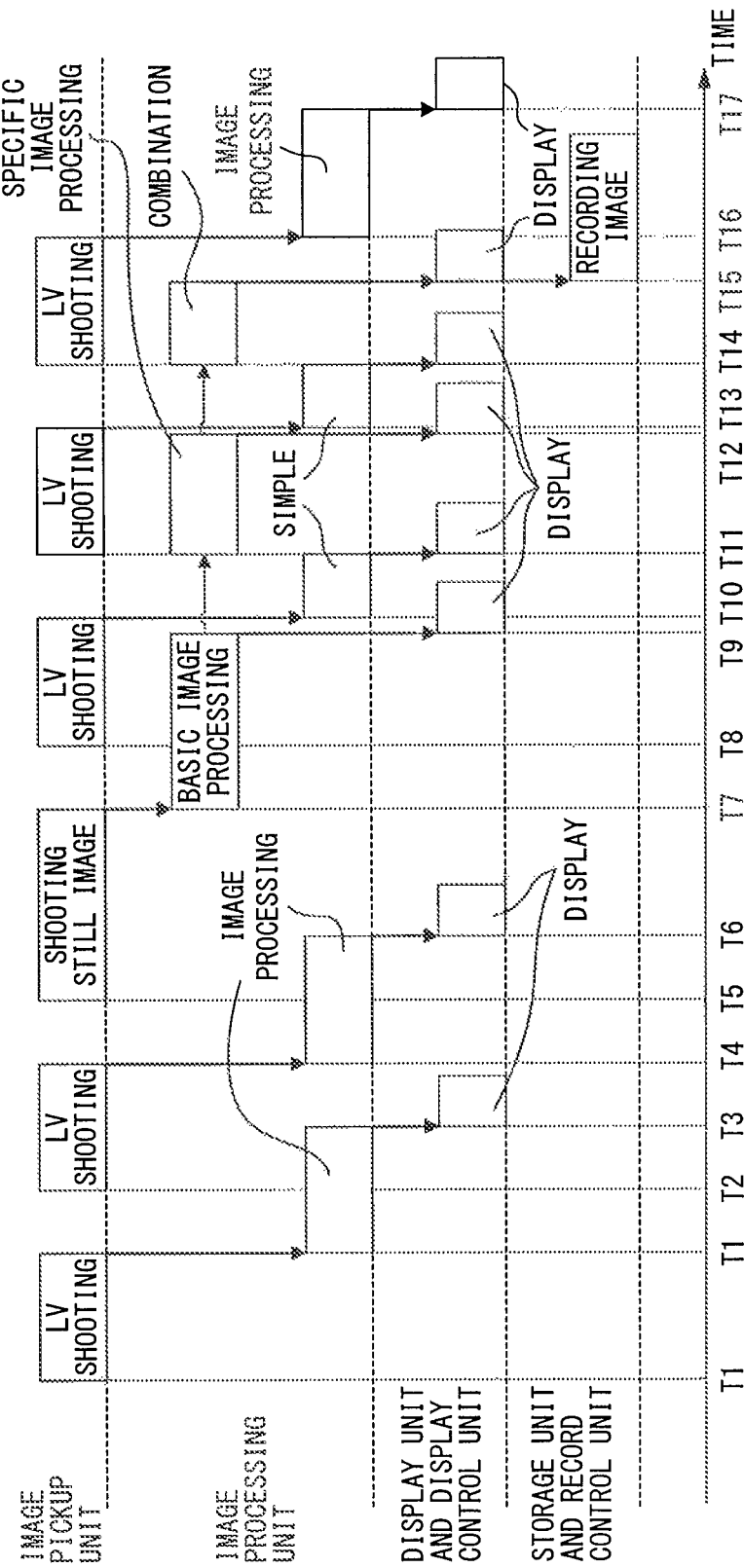
FIG. 34 is a timing chart of the process of each unit of the camera according to the embodiment 2 of the present invention.

In the state in which a live view image as illustrated in FIG. 33A is displayed, when the transition from OFF to ON of the second release switch, or a signal indicating the touch of an area in which the release button is displayed or a display area in which a live view image is displayed is detected, the microcomputer 121 performs a still image shooting operation using a mechanical shutter (S29).

Afterwards, the microcomputer 121 reads RAW data temporarily stored in the SDRAM 127 by shooting a still image, and allows the basic image processing unit 109a to perform the basic image processing illustrated in FIG. 4 (step S200). When the basic image processing is completed, the microcomputer 121 judges whether or not the shooting mode is the combined image mode (step S45). In this case, a judgment is performed by setting the shooting mode stored in the SDRAM 127.

When the shooting mode is not the combined image mode, that is, when it is the normal shooting mode, the microcomputer 121 skips step S47, and allows the image processing unit 109 to perform the simple LV process (step S800a). On the other hand, when the shooting mode is a combined image mode, the microcomputer 121 allows the image processing unit 109 to perform the simple LV process (step S800a) after the live view display change process (step S47). In the live view display change process, the microcomputer 121 changes the image displayed in the display area in which a live view image has been displayed into the image shot in step S29 and on which the basic image processing is performed in step S200, and the display area in which a live view image is to be displayed is switched.

The simple LV process illustrated in FIG. 32 is obtained by simplifying the processes in steps S35 through S39 in FIG. 31B (step S35, S37, S100, S39). Concretely, the microcomputer 121 first performs the AE operation for a live view image (step S801), and after the AE operation, performs a shooting operation using an electronic shutter (step S803).

Then, the microcomputer 121 changes the simple process setting to ON (step S805), reads RAW data temporarily stored in the SDRAM 127 by the shooting operation using an electronic shutter, and allows the image processing unit 109 to perform the image processing illustrated in FIG. 3 (step S100).

Since the image processing unit 109 is ON for the simple process setting, the basic image processing illustrated in FIG. 4 is performed in the image processing, but the specific image processing illustrated in FIG. 5 is substantially skipped. In the combined image processing illustrated in FIG. 6, only the combining process (step S413) is performed. That is, the live view image on which the basic image processing is performed is generated.

When the image processing is terminated, the microcomputer 121 returns the simple image process setting to OFF, and then a live view image on which only the basic image processing is performed is displayed (step S809), thereby terminating the simple LV process.

Figure 33B:
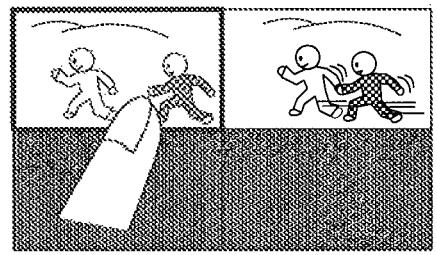

Thus, with the camera according to the present embodiment, as illustrated in FIG. 33B, after the second release operation, a frame image on which only the basic image processing has been performed is displayed (step S47 in FIG. 31B), and then, a live view image on which only the basic image processing has been performed is displayed (step S809 in FIG. 32).

Figure 33C:
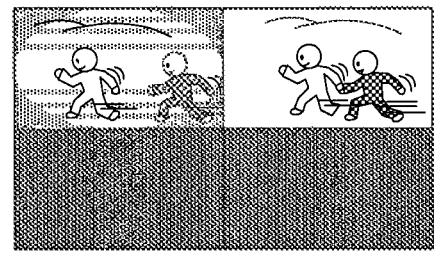

Afterwards, it is judged whether or not an art filter is set (step S49). If the art filter is set, the microcomputer 121 allows the specific image processing unit 109b to perform the specific image processing illustrated in FIG. 5 on the image data of the frame image on which the basic image processing is performed in step S200 after a shooting operation in step S29 (step S300). Thus, as illustrated in FIG. 33C, the display of the frame image is updated to the frame image on which the specific image processing has been performed.

After the specific image processing, the microcomputer 121 allows the image processing unit 109 to perform the simple LV process again to update a live view display (step S800b). Then, the combined image processing unit 109c judges whether or not the shooting mode is the combined image mode. If it is the combined image mode, the combined image processing unit 109c is allowed to perform the combined image generating process illustrated in FIG. 6 on the image data of the frame image (step S400).

Figure 33D:
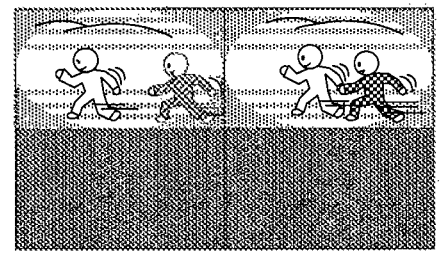

Finally, the microcomputer 121 performs the still image recording process illustrated in FIG. 7, and records the image data of the combined image in the recording medium 131 (step S500). Afterwards, the process in FIGS. 31A and 31B is repeatedly performed until the power is turned off. When the second releasing operation is not detected in step S27 which is performed again, and when the processes in steps S35 through S39 are performed, the live view image is updated into the image on which the specific image processing has been performed as illustrated in FIG. 33D.

The processes above are illustrated by a timing chart in FIG. 34. With the camera according to the present embodiment, the image processing unit 109 performs each of three image processes (basic image processing, specific image processing, combined image processing) on the image data of still images to be performed after the shoot instruction of the still image obtained by a shooting operation using a mechanical shutter at time intervals, and between the processes, the image processing is performed on the image data of the live view image.

Generally, the number of pixels of a still image (frame image) by the shooting operation using a mechanical shutter is larger than the number of pixels of a dynamic image (live view image), the image processing on the image data of the still image is longer than the image processing on the image data of the dynamic image. Therefore, if a still image is shot between the periodically performed shooting operation of a live view image, it takes a long time to update a live view image after the shoot instruction of the still image. The delay of the update of the live view image may considerably reduce the operability of the camera when an instruction to shoot a plurality of still images (frame images) while observing the live view image like shooting a combined image.

However, with the camera according to the present embodiment, the image processing is performed on the live view image between the image processes of still images as described above, thereby updating the live view image. Concretely, as illustrated in the timing chart in FIG. 34, the live view image obtained by performing the simple process (only basic image processing) on the still image by a shooting operation using an electronic shutter after the shoot instruction of a still image (time T5) is displayed twice (time T11, time T14), and a live view image generated by normal image processing (basic image processing and specific image processing) is displayed (time T17).

Therefore, with the camera according to the present embodiment, since the time taken from the shoot instruction to the display of a live view image after switching the display area of a live view image may be shortened, high operability in shooting a combined image may be realized without a display delay of a live view image although a combined image is configured by a still image having a large number of pixels.

In the flowchart in FIGS. 31A, 31B and 32, the execution order of the image processing on a still image and the image processing on a live view image is concretely described, but the order of the image processing is not specifically limited to the order above. So far as the display of a live view image is not delayed, the image processing may be performed in other orders. The digital camera is exemplified as an image pickup device in the above embodiments, but the technique above is not limited to equipment dedicated to a camera, but may be applied to a mobile telephone with a camera (smartphone), a tablet equipment unit, and other mobile terminals. Furthermore, the embodiments above are concrete examples of the present invention, and the present invention is not limited to the embodiments above. The image pickup device according to the present invention may be varied and changed within the scope of the gist of the present invention stated in the scope of the claims for the patent.

What is claimed is:

1. A shooting device comprising:
a display unit which is provided with a plurality of display areas for displaying a plurality of images;
a first reception unit which receives a shoot instruction;
a second reception unit which receives a cancel instruction that specifies a first display area of the display unit;
an image pickup unit which acquires an image by capturing a subject;
a display control unit which controls the display unit so that an image displayed in a display area in the plurality of display areas is changed from a live view image to the image acquired by the image pickup unit at the shoot instruction when the first reception unit receives the shoot instruction, and an image displayed on the first display area specified by the cancel instruction is changed to a specified image when the second reception unit receives the cancel instruction that specifies the display area in which the image acquired by the image pickup unit at the shoot instruction is displayed as the first display area;
an image processing unit which combines image data of the plurality of images displayed on the plurality of display areas, and generates image data of a combined image which is laid out as being displayed on the display unit;
a storage unit which stores image data of an image canceled by the cancel instruction; and
a third reception unit which receives a reconstruct instruction which specifies a second display area of the display unit, wherein
the display control unit controls the display unit so that when the third reception unit receives a reconstruct instruction, image data stored in the storage unit is read and an image displayed in the second display area specified by the reconstruct instruction is changed into image of image data read from the storage unit.

2. The device according to claim 1, wherein the specified image is a live view image.

3. The device according to claim 2, wherein upon receipt of the shoot instruction by the first reception unit, the display control unit controls the display unit so that an image displayed in one of the plurality of display areas is changed from a live view image to an image acquired by the image pickup unit according to the shoot instruction; and
a live view image is displayed in a display area in which an image not acquired by the image pickup unit at the shoot instruction is displayed, or in one of display areas in which an image is not displayed.

4. The device according to claim 1, wherein the second reception unit comprises:
a selection button which specifies the first display area of the display unit; and
a cancel button which determines specification of the first display area by the selection button; wherein the cancel instruction is a signal generated by an operation of the selection button and cancel button.

5. The device according to claim 1, wherein:
the second reception unit comprises a touch panel sensor arranged as overlapping the display unit; and
the cancel instruction is a signal generated by an operation performed on a display area of the display unit.

6. The device according to claim 1, wherein the second reception unit comprises a touch panel sensor arranged as overlapping the display unit; and
the cancel instruction is a signal generated by an operation of dragging a display area of the display unit to a specific area.

7. The device according to claim 1, further comprising:
a control unit which captures a new still image which replaces the specified image on the first display area specified by the second reception unit.

8. An image processing method, comprising:
displaying a live view image in at least one display area of a plurality of display areas of a display unit;
receiving a shoot instruction;
acquiring an image of a subject according to the shoot instruction;
changing an image displayed in one display area of the plurality of display areas from the live view image to the image acquired at the shoot instruction;
receiving a cancel instruction to specify a first display area in which the image acquired at the shoot instruction is displayed;
changing the image displayed in the first display area specified by the cancel instruction into a specified image;
combining image data of a plurality of images displayed in the plurality of display areas of the display unit, and generating image data of a combined image obtained by laying out the plurality of images as displayed on the display unit;
storing image data of the image canceled by the cancel instruction:
receiving a reconstruct instruction which specifies a second display area of the display unit; and
controlling so that when the reconstruct instruction is received, the image data of the image canceled by the cancel instruction is read and an image displayed in the second display area specified by the reconstruct instruction is changed into an image of the read image data.

9. A non-transitory recording medium storing a program used to direct a computer provided with a display unit having a plurality of display areas to execute image processing, the program comprising processing steps of:
displaying a live view image in at least one display area of a plurality of display areas of a display unit;
receiving a shoot instruction;
acquiring an image of a subject according to the shoot instruction;
changing an image displayed in one display area of the plurality of display areas from the live view image to the image acquired at the shoot instruction;
receiving a cancel instruction to specify a first display area in which the image acquired at the shoot instruction is displayed;
changing the image displayed in the first display area specified by the cancel instruction into a specified image;
combining image data of a plurality of images displayed in the plurality of display areas of the display unit, and generating image data of a combined image obtained by laying out the plurality of images as displayed on the display unit;
storing image data of the image canceled by the cancel instruction;
receiving a reconstruct instruction which specifies a second display area of the display unit; and controlling so that when the reconstruct instruction is received, the image data of the image canceled by the cancel instruction is read and an image displayed in the second display area specified by the reconstruct instruction is changed into an image of the read image data.

* * * * *